Figure 1:
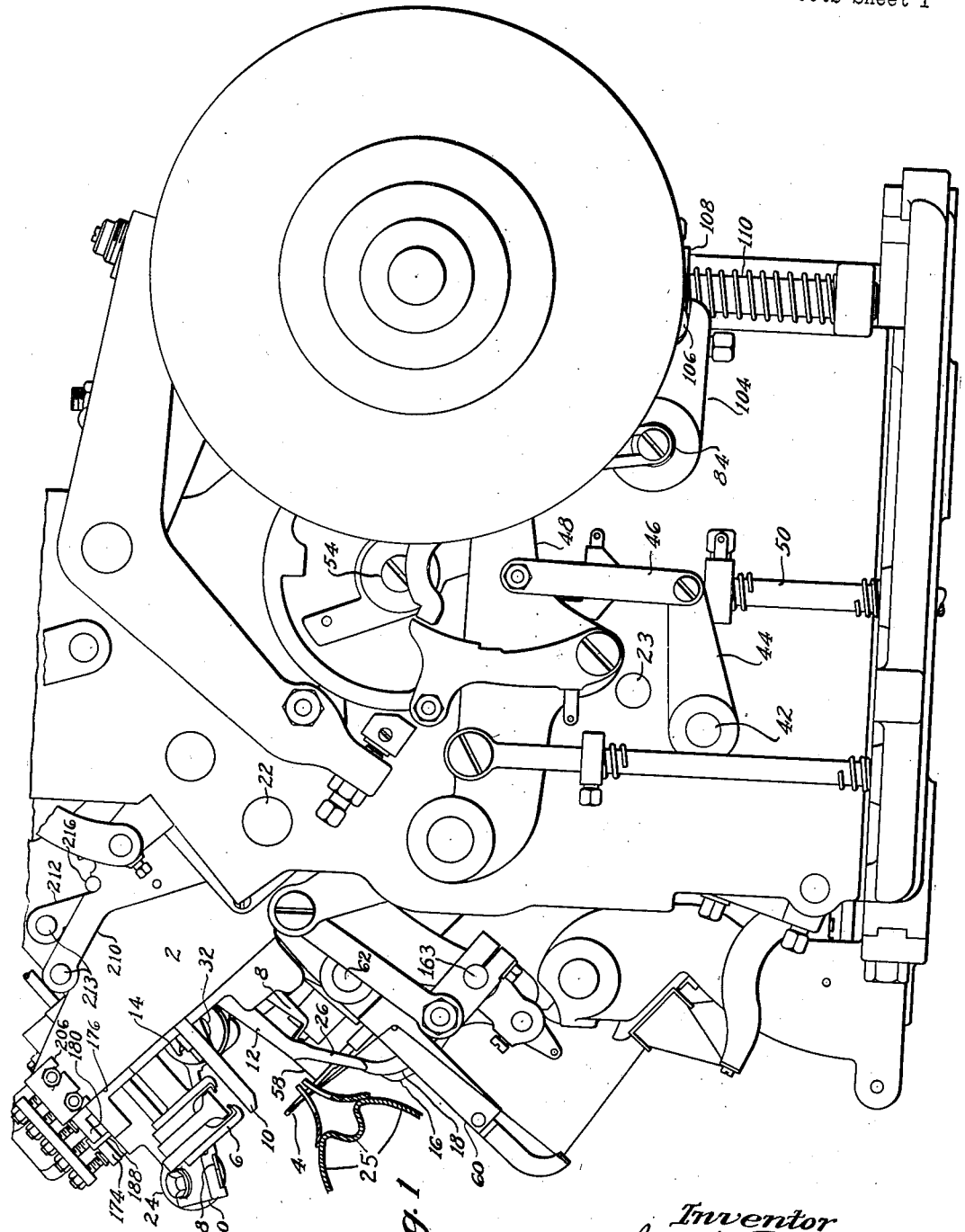

Aug. 24, 1943.　　　　J. FOSSA　　　　2,327,345
SHOE UPPER LACING MACHINE
Filed May 17, 1940　　　15 Sheets-Sheet 3

Witness
Paul F. Bryant

Inventor
Joseph Fossa
by Fish Hildreth
Cary & Jenney Attys.

Aug. 24, 1943.     J. FOSSA     2,327,345
SHOE UPPER LACING MACHINE
Filed May 17, 1940      15 Sheets-Sheet 4

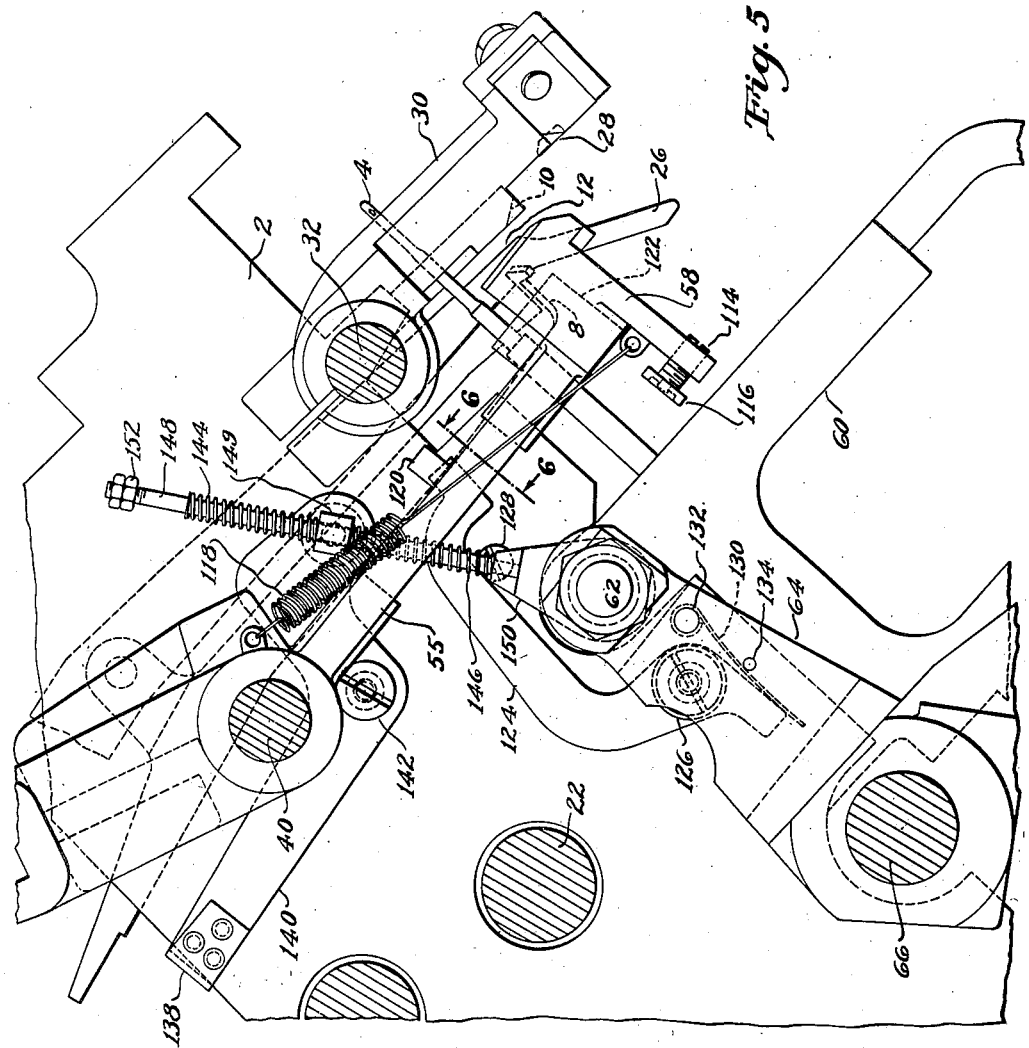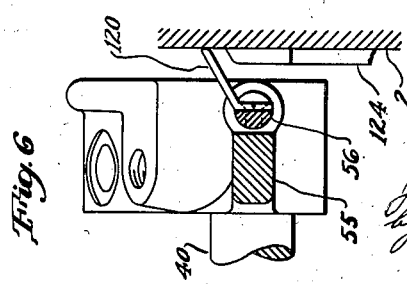

Aug. 24, 1943.  J. FOSSA  2,327,345
SHOE UPPER LACING MACHINE
Filed May 17, 1940   15 Sheets-Sheet 6

Witness
Paul F. Bryant

Inventor
Joseph Fossa
by Fish Hildreth
Cary & Jenney Attys.

Aug. 24, 1943.  J. FOSSA  2,327,345
SHOE UPPER LACING MACHINE
Filed May 17, 1940   15 Sheets-Sheet 7

Witness
Paul F. Bryant

Inventor
Joseph Fossa
by Fish Hildreth
Cary & Jenney Attys

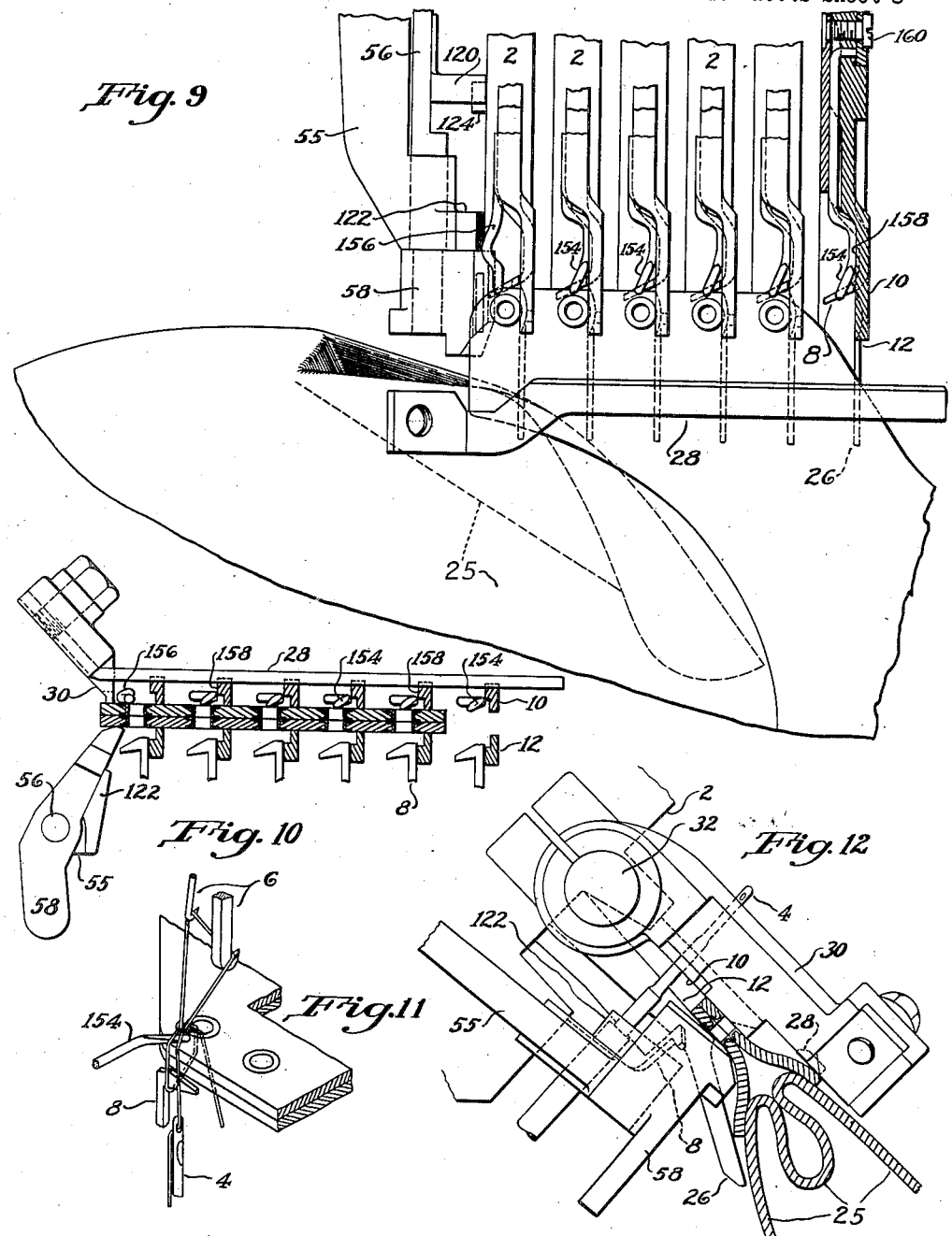

Aug. 24, 1943.  J. FOSSA  2,327,345
SHOE UPPER LACING MACHINE
Filed May 17, 1940  15 Sheets-Sheet 9
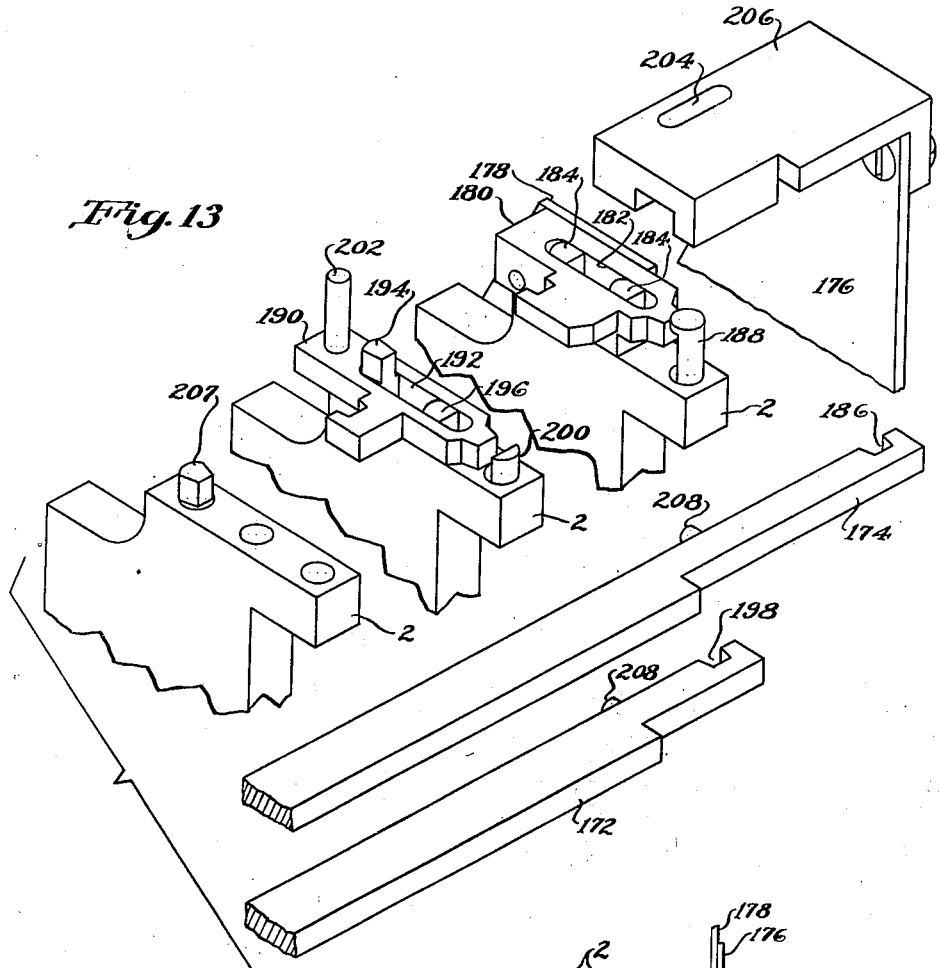
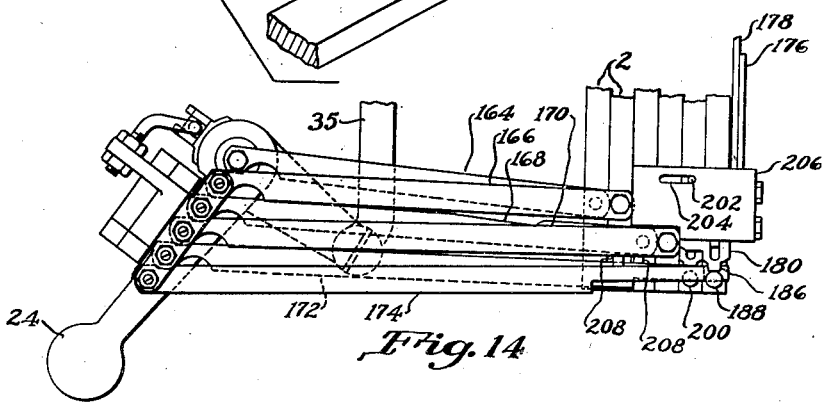
Witness
Paul F. Bryant
Inventor
Joseph Fossa
by Fish Hildreth
Cary & Jenney Attys

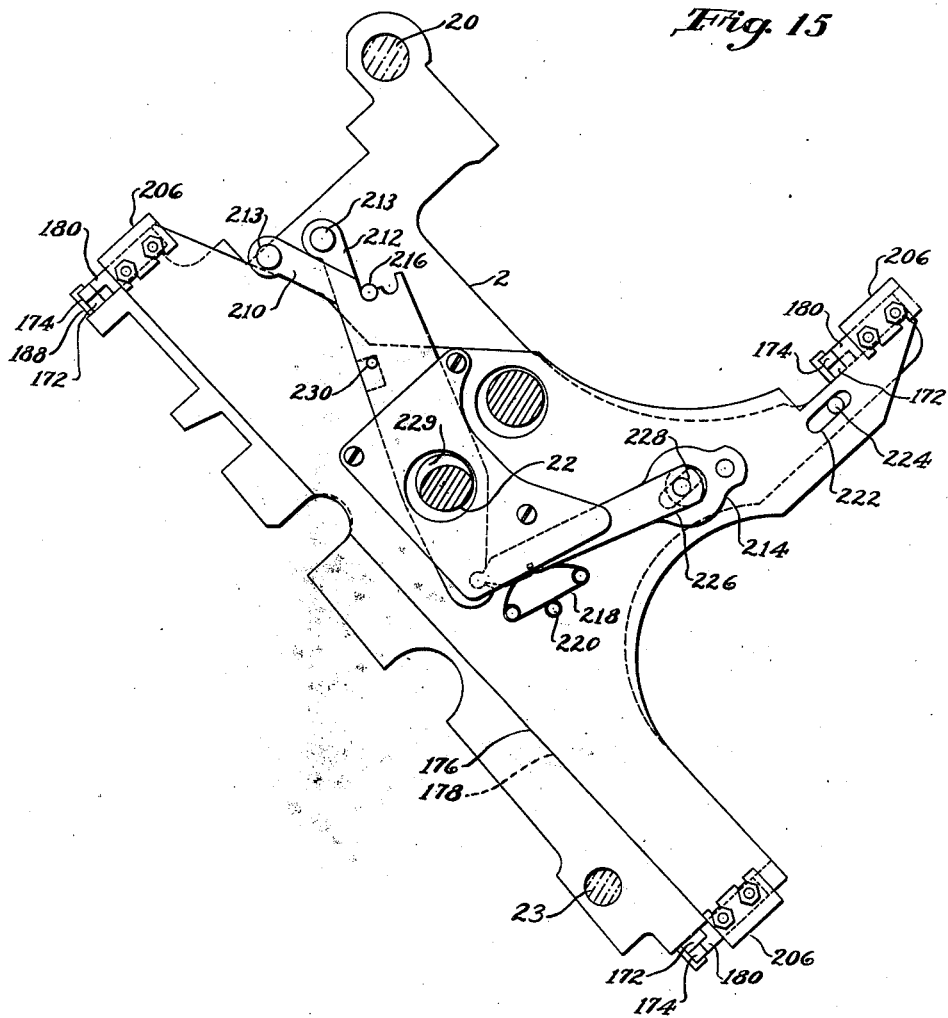

Aug. 24, 1943.     J. FOSSA     2,327,345
SHOE UPPER LACING MACHINE
Filed May 17, 1940     15 Sheets-Sheet 11

Witness
Paul F. Bryant

Inventor
Joseph Fossa
by Fish Hildreth
Cary & Jenney Attys.

Aug. 24, 1943.  J. FOSSA  2,327,345
SHOE UPPER LACING MACHINE
Filed May 17, 1940   15 Sheets-Sheet 12

Aug. 24, 1943.    J. FOSSA    2,327,345
SHOE UPPER LACING MACHINE
Filed May 17, 1940    15 Sheets-Sheet 13

Witness
Paul F. Bryant

Inventor
Joseph Fossa
by Fish Hildreth
Cary & Jenney Attys.

Aug. 24, 1943. J. FOSSA 2,327,345
SHOE UPPER LACING MACHINE
Filed May 17, 1940 15 Sheets-Sheet 14

Witness
Paul F. Bryant

Inventor
Joseph Fossa
by Fish Hildreth
Cary & Jenney Attys.

Aug. 24, 1943. J. FOSSA 2,327,345
SHOE UPPER LACING MACHINE
Filed May 17, 1940 15 Sheets-Sheet 15

Patented Aug. 24, 1943

2,327,345

UNITED STATES PATENT OFFICE 2,327,345

SHOE UPPER LACING MACHINE

Joseph Fossa, Salem, Mass., assignor to United Shoe Machinery Corporation, Borough of Flemington, N. J., a corporation of New Jersey Application May 17, 1940, Serial No. 335,724

34 Claims. (Cl. 112—5)

The present invention relates to shoe upper lacing machines and more particularly to improvements in a lacing machine of the type disclosed in U. S. Letters Patent of the present applicant No. 2,106,320, dated January 25, 1938, and in applicant's pending application Serial No. 217,003, filed July 1, 1938 (now United States Letters Patent No. 2,281,686, granted May 5, 1942).

In the machine of the patent and application, an unlaced shoe upper is applied by the operator to a series of lacing needles held in a convenient position at the front of the machine to permit the eyelets of the upper to be impaled on the needles. Thereafter, when the machine is started, the needles draw the upper rearwardly into operative position and the upper is then gripped by a series of clamping members so that when the needles are withdrawn from the eyelets during the formation of the lacing, each pair of eyelets will be retained accurately in position.

The machine disclosed in the patent and application has been found to operate satisfactorily on many classes of work and particularly on uppers to which the vamp has not been sewed. The machine has also been found to operate satisfactorily on uppers such as are employed in either a Bal or Blucher type shoe having the vamp sewed thereto, where the upper is of comparatively soft, yielding material as, for instance, the type of upper with the vamp attached illustrated in Fig. 2 of the patent. With this machine, however, some difficulty has been experienced in operating upon uppers with the vamp attached composed of comparatively stiff, heavy material or uppers having one or more extra thicknesses of material on the upper outside of the lines of eyelets, although uppers of this character can be operated upon satisfactorily if no attempt is made to lace the pair of eyelets at the toe end of the lacing slit. More particularly, difficulty has been experienced in operating upon small-sized uppers of the Blucher type.

The difficulties encountered in operating upon shoe uppers with attached vamps has been due largely to the fact that, in the machine of the patent and application, the upper engaging surfaces of the clamping members, which are substantially parallel when in contact with the upper, extend across the line of eyelets in the folded upper to a considerable distance onto the body portion of the upper. By reason of this construction and arrangement of the upper clamping members, the several thicknesses of material at the toe end of the lacing slit resulting from folding the vamp, and the several thicknesses along the lacing slit produced by folding back the tongue, tend to hold the clamping members apart and prevent the upper from being firmly gripped close to the eyelets. As a consequence, the upper close to the eyelets may be insecurely supported and also the clamping members may act on the upper in such a way as to tend to displace the eyeletted edges. A shift in the positions of the eyelets resulting from these conditions, after the needles are withdrawn, may occasion injury to the upper or to the lacing devices or cause improper formation of the lacings.

In operating upon uppers with attached vamps, difficulty has also sometimes been experienced with the machine of the patent and application in applying the folded vamp and upper to the needles and in causing the upper to be drawn by the needles into operating position on the start of the machine, this difficulty being also due in large part to the construction and arrangement of the upper clamping devices.

An object of the present invention is to provide a shoe upper lacing machine with upper clamping members constructed and arranged to engage, close to the eyelets, the eyeletted edge of a shoe upper and hold the eyelets accurately in position during the lacing operation and also hold the upper in a position to avoid injury to the upper or improper operation of the lacing devices, regardless of the shape, type of construction, or style of the upper presented to the machine.

Another object of the invention is to facilitate the application of a folded upper to the needles of a machine of the general character disclosed in the patent and application above referred to and to insure an unimpeded movement of the upper into operating position without the exercise of special skill or attention on the part of the operator.

Other objects of the invention are to improve and simplify in other respects the construction and operation of shoe upper lacing machines of the general type disclosed in the patent and application and more particularly to simplify and improve the mechanism for spacing the eyelet engaging devices to correspond to the distance between the eyelets, to improve the mechanism for controlling the slack forming measuring fingers, to improve the construction of the cord end gripping devices, and to provide means for insuring an accurate location of the lacing cords as they are passed across the edges of the upper and particularly to prevent a lacing at the end of the lacing slit from slipping around the end of the eyeletted edge.

With the above and other objects in view, as will hereinafter appear, a feature of the present invention contemplates clamping the upper by means of clamping members which terminate substantially at the line of eyelets and in connection with these clamping members providing means to act on the unclamped portion of the upper so as to prevent the unclamped portion from being injured during the lacing operation or from interfering with the needles and cooperating lacing devices. In the machine hereinafter described, the means acting on the unclamped portion of the upper comprises a bar extending substantially parallel to the line of eyelets and preferably on a plane above the plane of the clamping surface of the clamping members. In the construction hereinafter described, the means acting on the unclamped portion of the upper also comprises upper engaging surfaces on the upper clamping members at one side of the upper, which surfaces are formed on the clamping members and diverge from the clamping surfaces of said members. These diverging surfaces preferably are arranged to cooperate with the bar above referred to, which extends parallel to the line of eyelets, the bar being arranged to act on one side of the upper and the diverging surfaces being arranged to act on the other side of the upper. The machine in which the several features of the present invention have been embodied is provided with a series of needles which are moved with the upper thereon from a position in which the upper may be readily placed on the needles towards operating position in which the lacing of the upper is completed. In this type of machine, the diverging surfaces of the upper clamping members are preferably arranged to contact with and to support the unclamped portion of the upper during its movement with the needles into operative position.

To facilitate the application of the folded upper to the needles of a machine in which the needles are moved with the upper into operating position, a feature of the present invention contemplates the provision in such a machine of a support for the upper when placed on the needles constructed and arranged to move with the needles during their movement to operating position. In the machine hereinafter described, this support, in addition to forming a gage to position the upper with relation to the needles and in addition to supporting the upper during its movement into operating position, is arranged to cooperate, when the upper is in operating position, with a clamping jaw to clamp the upper at the line of eyelets. In this connection, it is to be noted that the provision in this type of machine of a support for the upper when placed on the needles, together with a clamping jaw cooperating with the support to clamp the upper at the line of eyelets while the upper is in operating position constitutes a new and useful combination, capable of use in a construction and arrangement of parts in which the support does not move with the needles.

To still further facilitate movement of the upper into operating position, a feature of the present invention contemplates the provision in a machine of the type disclosed in the patent and application above referred to provided with slack-forming, cord-measuring fingers, of means for moving the fingers with relation to the upper clamping members so as to bring the fingers out of the path taken by the upper during its movement to operating position. In embodying this feature in the illustrated machine, mechanism is provided for moving the levers having the slack forming fingers away from the abutment against which they are drawn by the lacing cords during the lacing operation. This feature overcomes a difficulty occasionally encountered during the operation of the patented machine, the measuring fingers of which, under certain circumstances, were liable to catch on the upper as it was drawn by the needles between the clamping members.

It is desirable, in machines to which the present invention relates, especially when operating on uppers to which the vamp and tongue have been attached, to clamp the upper as close as possible to the eyelets at the toe end of the lacing slit in order to prevent the folded back tongue from forcing itself between the eyelets of the last pair and becoming injured or interfering with the operation of the lacing devices. To secure this result, a feature of the present invention contemplates the provision of means for imparting a movement to one of the upper clamping members lengthwise of the series of needles, in addition to its movements to clamp and release the upper. By thus moving a clamping member, the upper may be clamped close to the last pair of eyelets at the toe end of the lacing slit without interference with any of the lacing instrumentalities as, for instance, a slack-forming, cord-measuring finger such as is employed in the machine of the patent. In the machine hereinafter described, this feature is embodied in mechanism for moving the support for the upper above referred to lengthwise of the series of needles, the clamping surface of the support being arranged to engage the upper close to the last pair of eyelets at the toe end of the lacing slit and during its movement lengthwise of the series of needles to enter the space between the upper and the cord-measuring finger associated with the last needle.

To insure an accurate location of the lacing cords as they are passed across the edges of the upper and particularly to prevent a lacing at the end of the lacing slit from slipping around the end of the eyeletted edge, a feature of the present invention contemplates the provision of means associated with each needle arranged to engage the lacing cord as it is passed across the edges of the folded upper and guide the cord to a predetermined definite position with relation to the eyelets through which the lacing is inserted. In the illustrated embodiment of this feature of the invention, this guiding means comprises pointed members, or guide points, located on the opposite side of the upper from the measuring fingers and cooperating with the fingers to cause each pair of eyelets to be laced uniformly and with the same amount of excess cord. Also, in the illustrated embodiment of this feature of the invention, the guide points are shaped and arranged to prevent distortion or flexing of the edges of the upper by the strain exerted on the cords in forming the lacings, the loops of the lacings while being tightened being supported on one side of the upper by the guide points and on the other side of the upper by the measuring fingers. The points of the guide members, as hereinafter described, are arranged at an angle to the eyeletted edges so that when the upper moves outwardly from the machine after the lacing operations are completed, the lacings may readily be withdrawn from the guide points. To support the guide points, they are secured to the clamping members and in order to insure a firm contact with the upper, they are arranged to yield slightly as they engage the upper.

To improve the construction and arrangement of the cord end gripping devices of the patented machine, a feature of the present invention contemplates locating the gripping members with relation to the clamping members so as to shield the terminals of the clamping members while the upper is being applied to the needles and while the upper is being moved into operating position by the needles. A further feature of the invention relating to the cord end gripping devices contemplates providing the gripping members with means for retaining a cord after being released by the gripping members in position to be again grasped by the gripping members. The specific embodiment of this feature comprises a flange on one of the gripping members arranged to overlap the cord gripping portions of the gripping members and to extend transversely to the length of the cord so as to prevent escape of the cord while permitting lengthwise movement of the cord when released.

In the machine of applicant's patent and pending application, the frames of the lacing units in which the eyelet engaging needles are mounted are adjusted towards and from each other to correspond to the distance between the eyelets of the upper to be laced by a spacing mechanism comprising a single manually operated lever and three sets of links connected to the frames at widely separated points. To permit the use of less than the entire number of lacing units, the machine, as fully disclosed in the pending application, is provided with means for disconnecting one or more of the frames at one end of the series from the spacing mechanism and for connecting the disconnected frame or frames to the next adjacent frame. In the construction disclosed in the pending application, means for disconnecting the frames from the spacing mechanism involves the use of telescoping links and means for locking the sections of the links from movement with relation to each other. To unlock the sections of the links and to secure the disconnected frames to the next adjacent frame, connections to all three sets of links are provided from a single lever mounted adjacent the manually operated spacing lever. By reason of the telescoping construction of the links, and the connections from a single lever to the three sets of links at widely separated points, the disconnecting mechanism disclosed in the pending application, while satisfactory in operation, is complicated and expensive to construct and assemble. Accordingly, certain features of the present invention have been embodied in a simplified and improved mechanism for disconnecting the frames from the spacing mechanism. A feature of this disconnecting means contemplates mounting the means for disconnecting a frame from the spacing mechanism directly on the frame. Specifically, this means consists of a latch mounted on the frame and movable to disconnect the frame from the spacing mechanism and to connect the frame to the next adjacent frame. A latch is provided at each of the separated points at which the frames are connected to the spacing mechanism and in the construction hereinafter specifically described, a single member, in the form of a sliding plate, is connected to all of the latches. The spacing mechanism for the frames comprises links, as in the machine of the patent and application, and a feature of the specific disconnecting mechanism consists in the provision of disconnectible lugs and notches between one or more of the frames and their actuating links, the lugs being constituted by a portion of the latches and the notches being formed in the links. Other features of the disconnecting mechanism are the provision of means for preventing actuation of the latches to disconnect a frame and connect it to the next adjacent frame except at the limit of movement of the frames towards each other, the provision of two levers on a single frame and connections from the levers for disconnecting two of the frames, and the provision of means for preventing actuation of the levers except in predetermined sequence.

Figure 2:
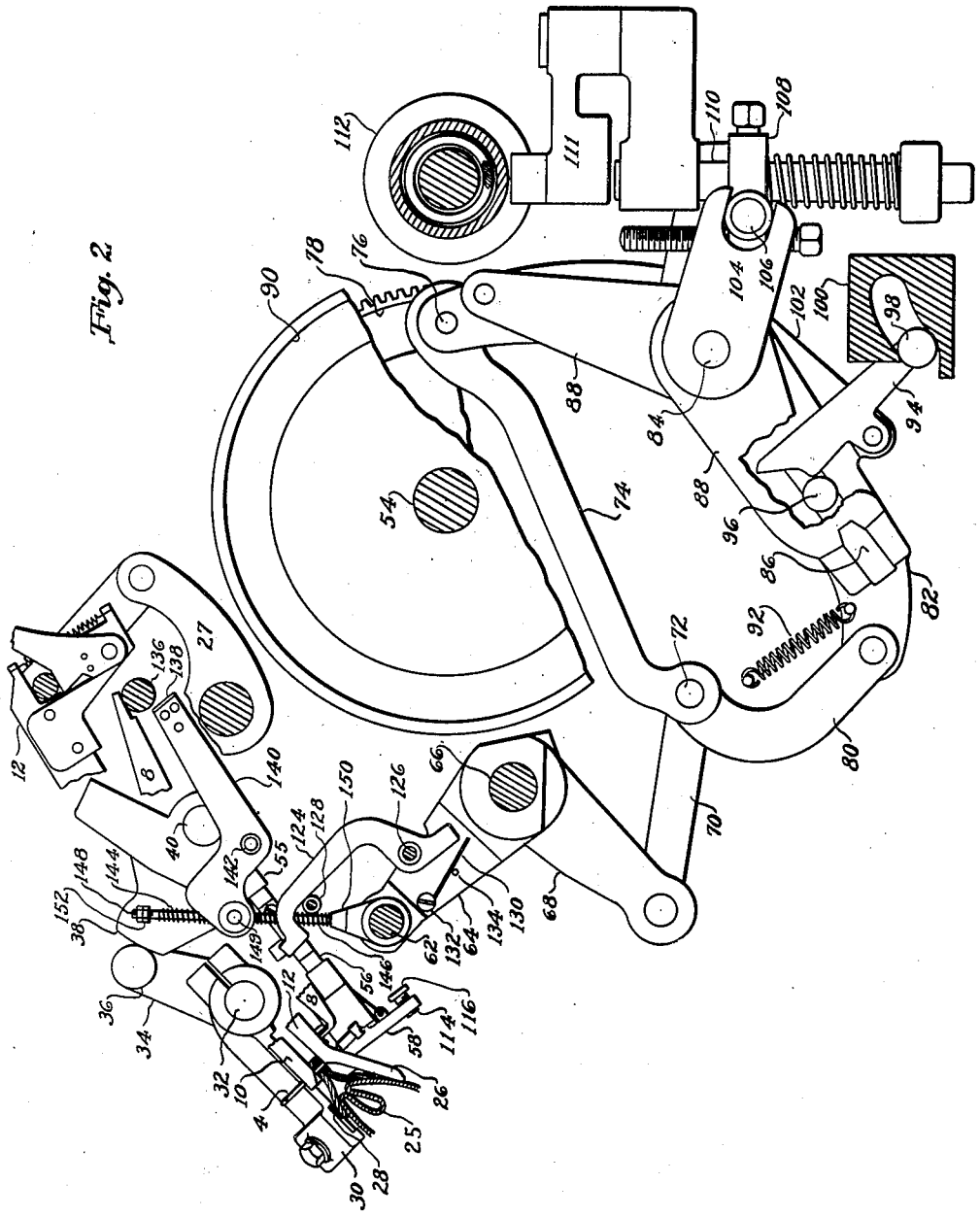
Figure 3:
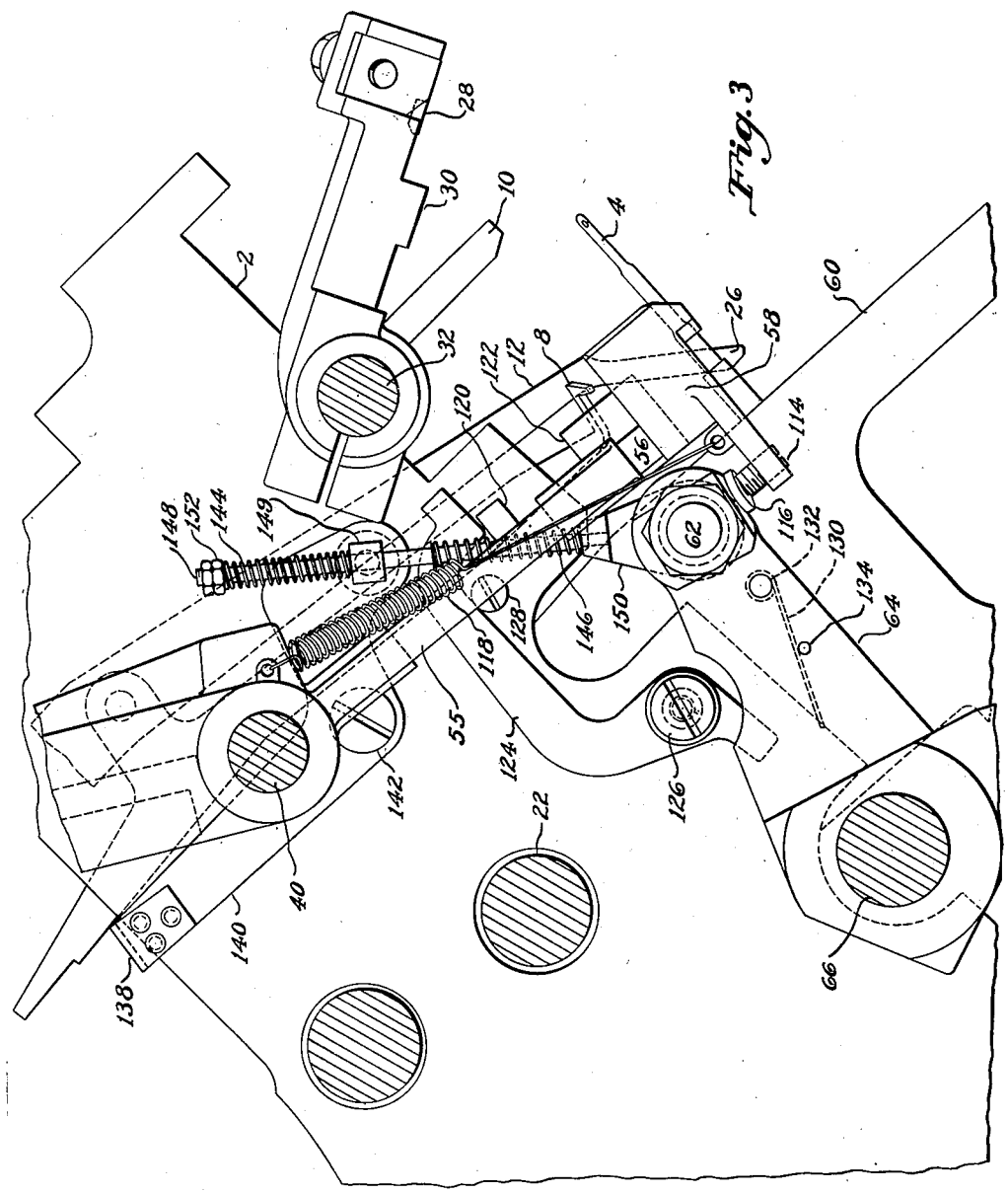
Figure 4:
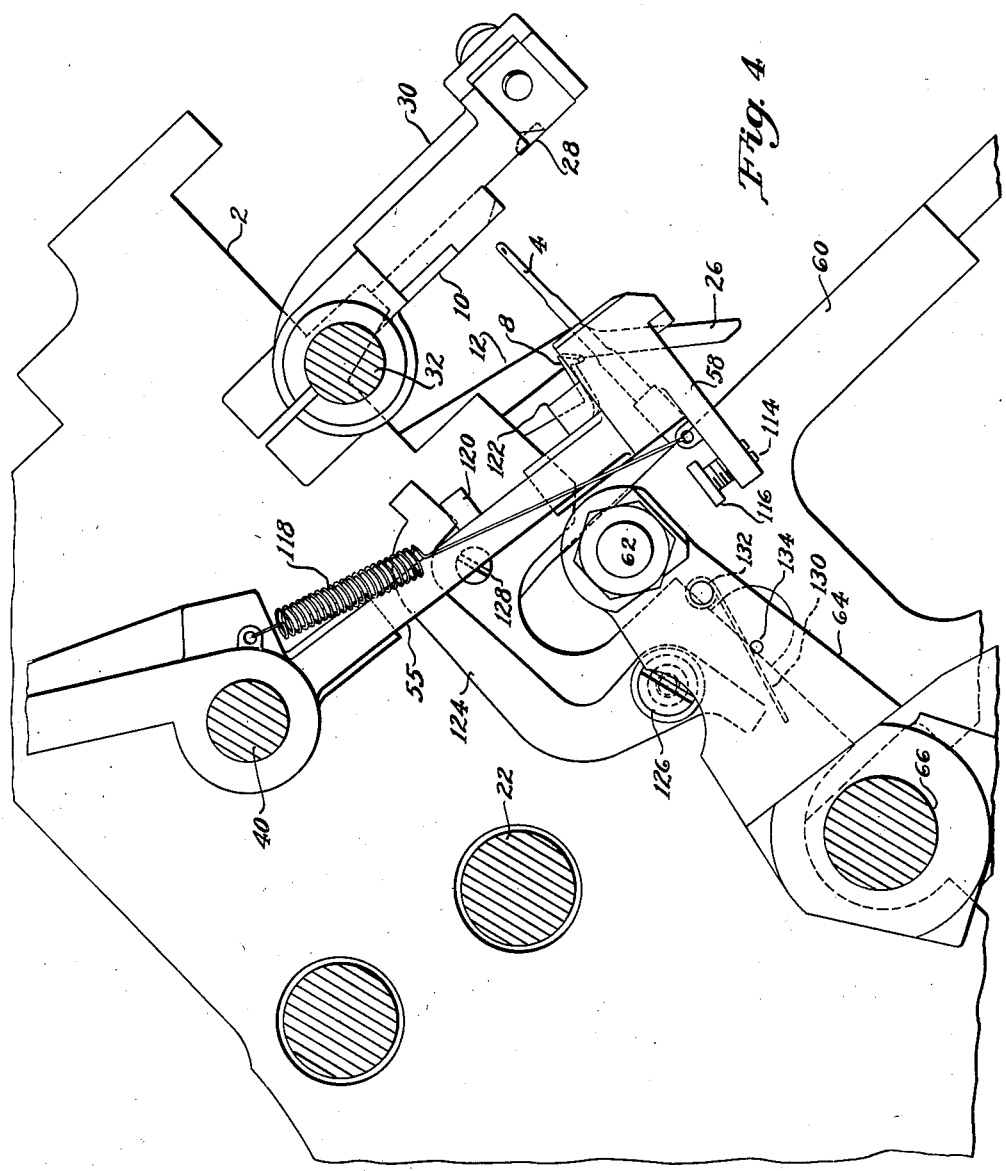
Figure 7:
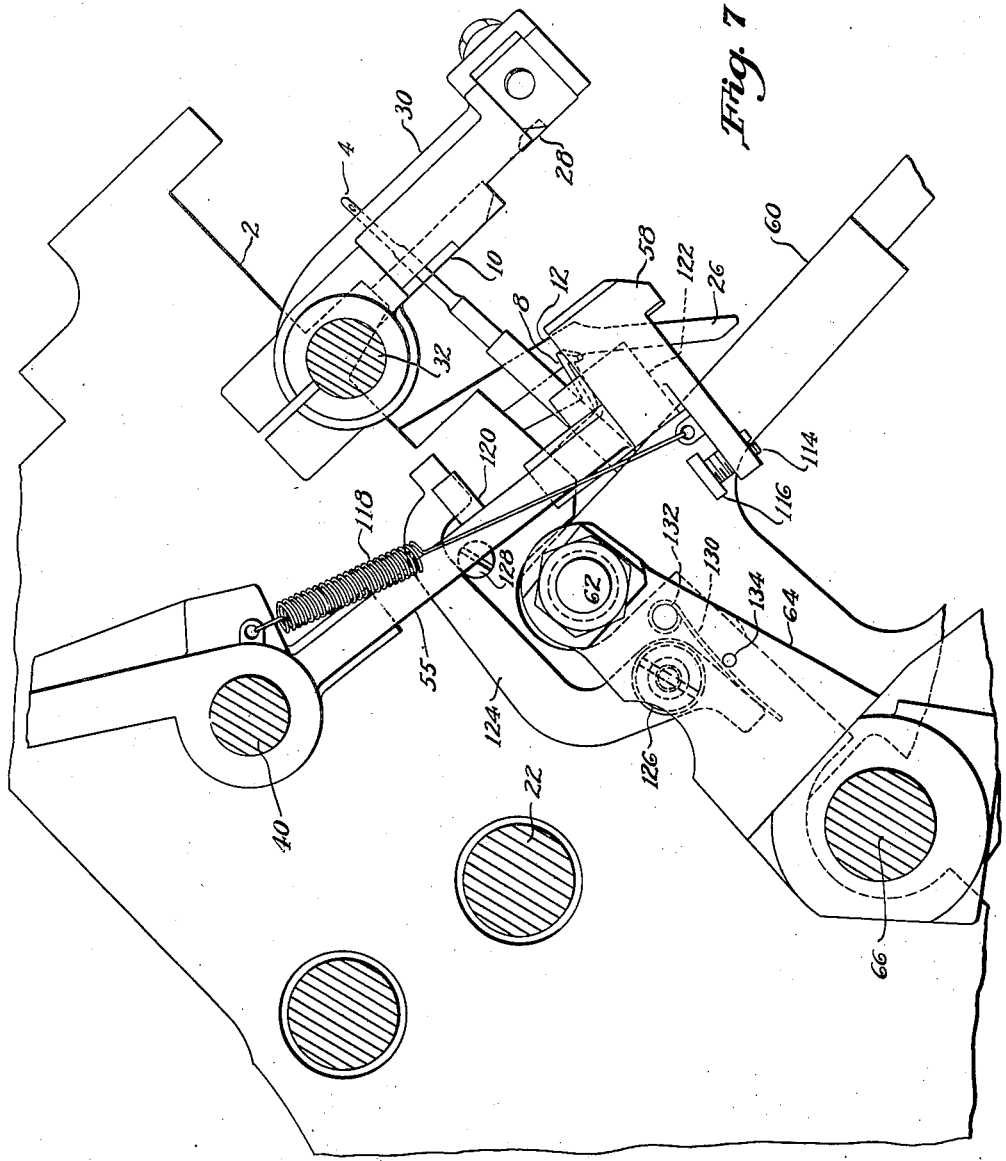
Figure 8:
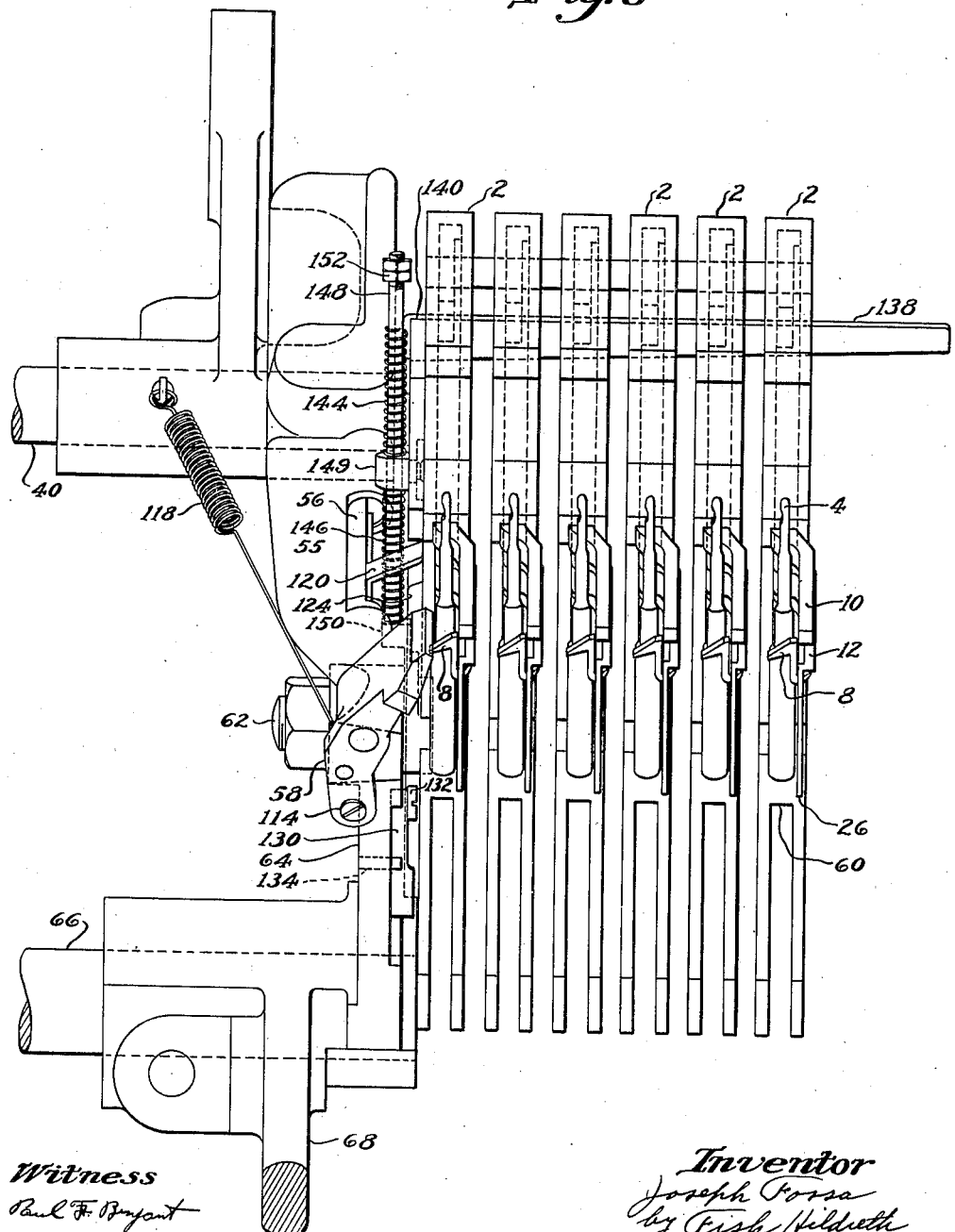
Figure 16:
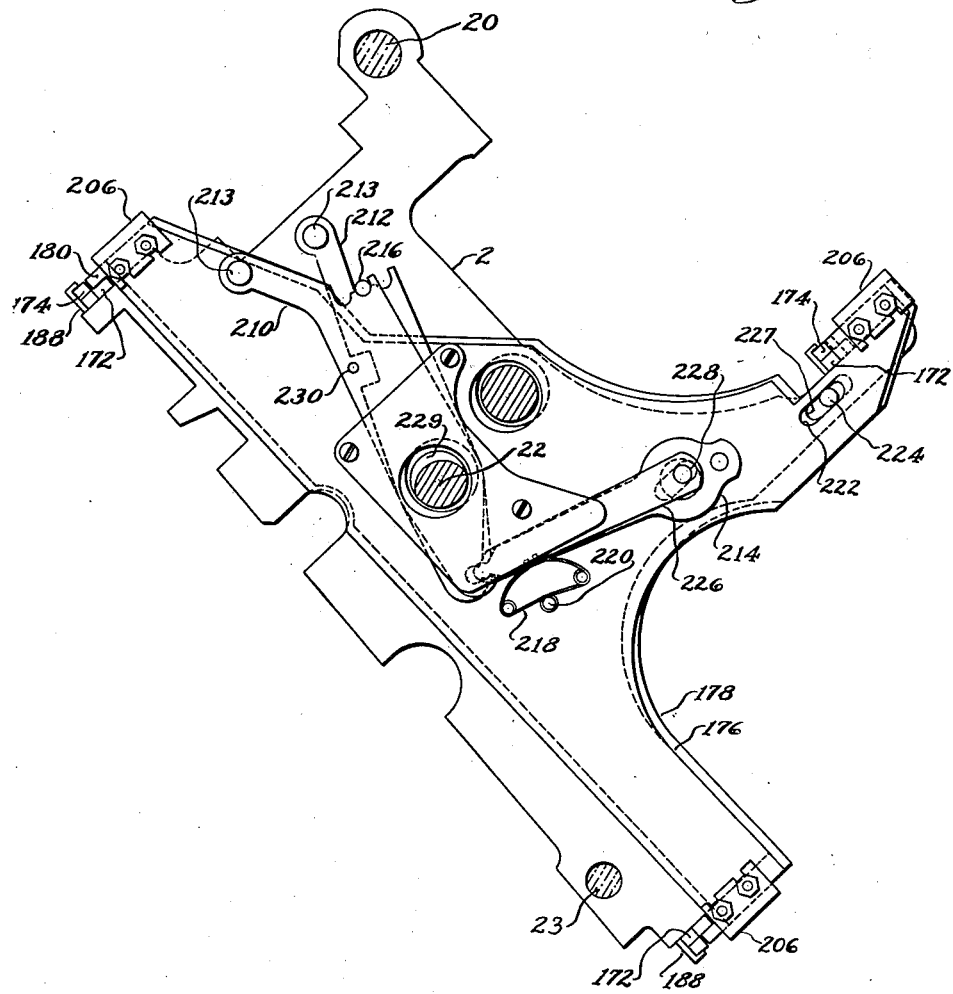
Figure 17:
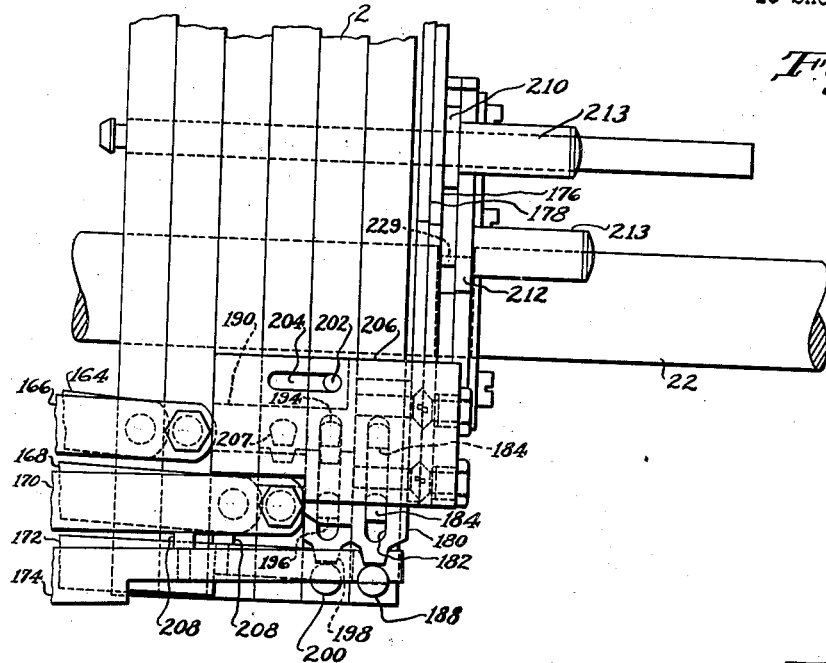

In addition to the features of invention above referred to, the present invention also consists in certain constructions, combinations and arrangements of parts hereinafter described and claimed, the advantages of which will be readily understood by one skilled in the art from the following description taken in connection with the accompanying drawings, in which Fig. 1 is a view in right-hand side elevation of a lacing machine embodying the features of the present invention, illustrating the positions of the parts after an eyletted shoe upper has been applied to the machine but before the machine is started; Fig. 2 is a detail view of certain portions of the needle actuating mechanism, and other parts of the machine, illustrated in positions assumed just after the machine is started; Fig. 3 is a detail view on an enlarged scale looking from the left-hand side of a portion of one of the lacing units of the machine, with certain of its associated parts, taken while the machine is at rest; Fig. 4 is a similar view of the same parts taken just as the starting treadle is being depressed; Fig. 5 is a similar view of the same parts in running positions; Fig. 6 is a sectional view taken along the line 6—6 of Fig. 5; Fig. 7 is a view of the parts illustrated in Fig. 5 taken in positions assumed at the end of the lacing operations after the upper has been released; Fig. 8 is a view in front elevation of the series of lacing units and the lower clamping jaw and support on which the upper rests when applied to the needles; Fig. 9 is a detail plan view, partly in section, of the upper engaging portions of the individual clamping members and guide points, together with a shoe upper of the Blucher type secured in operative position thereby; Fig. 10 is a sectional view taken along the line of eyelets; Fig. 11 is a perspective view illustrating more clearly the manner of operation of the guide points; Fig. 12 is a view in left side elevation, and partly in section, of those portions of the machine illustrated in Fig. 9; Fig. 13 is an enlarged perspective view of the spacing connections and their disconnecting devices illustrated in separated relation; Fig. 14 is a plan view of the spacing connections and portions of the lacing units to which they are connected; Fig. 15 is a detail side view of the frame of the right-hand end lacing unit illustrating the sliding plates and control levers for disconnecting or connecting the unit, the levers being shown in connecting positions; Fig. 16 is a view of the same parts with one of the disconnecting levers in disconnecting position and the other in connecting position; Fig. 17 is a view of the upper portions of the lacing units, as illustrated in Fig. 14, showing the disconnecting levers in connecting positions corresponding to the positions of the disconnecting levers in Fig. 15; Fig.

Figure 19:
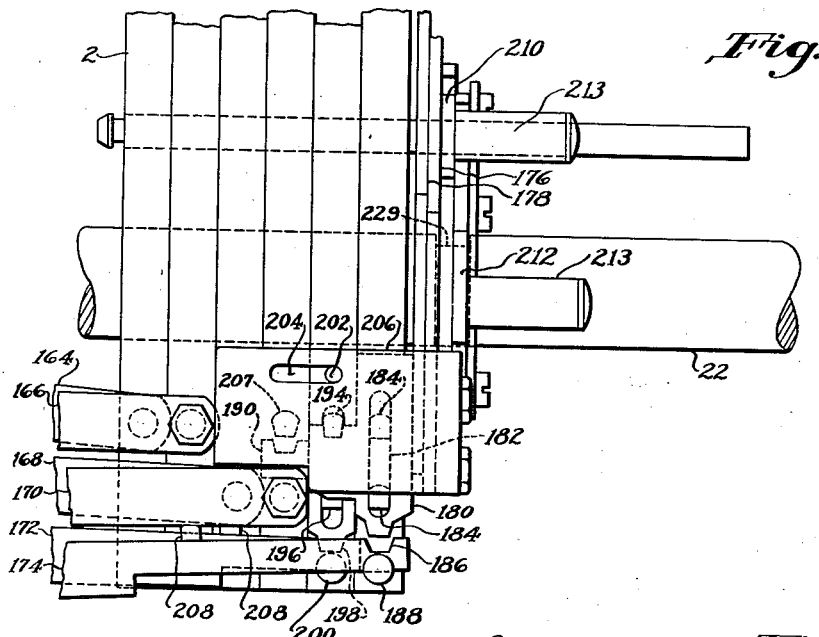
Figure 20:
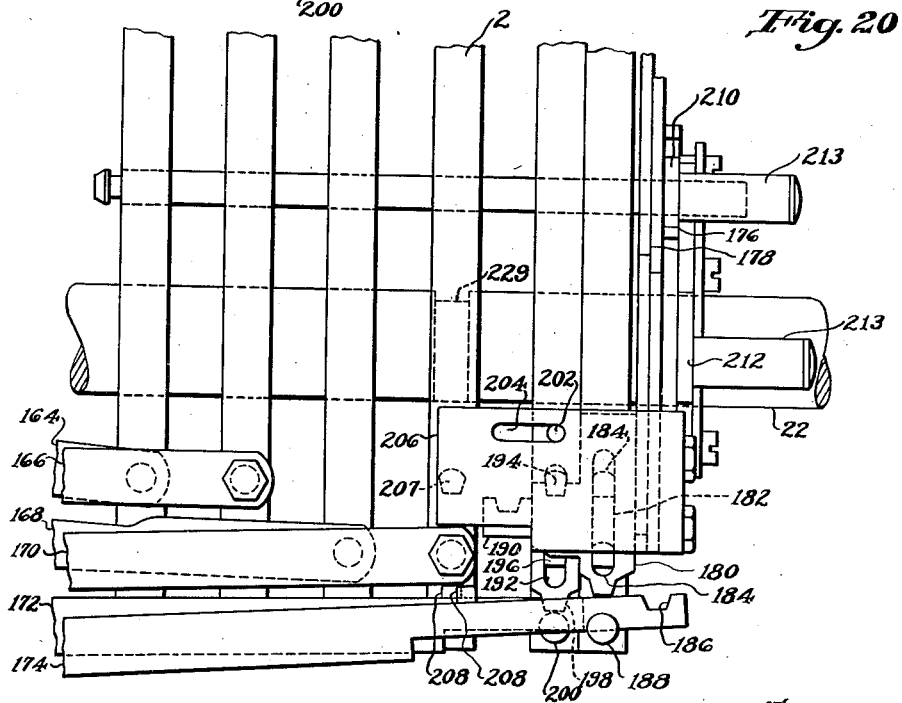
Figure 21:
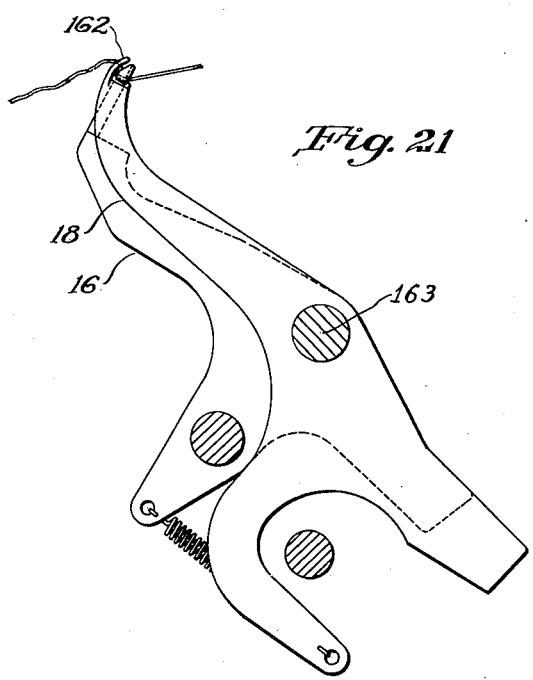
Figure 22:
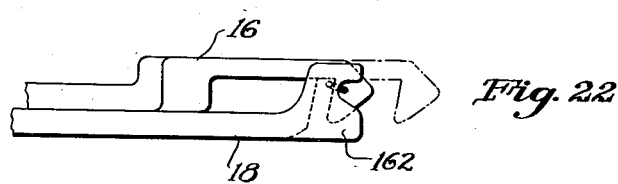
Figure 23:
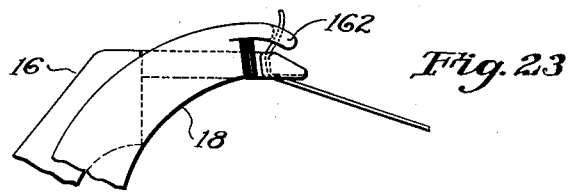
Figure 24:
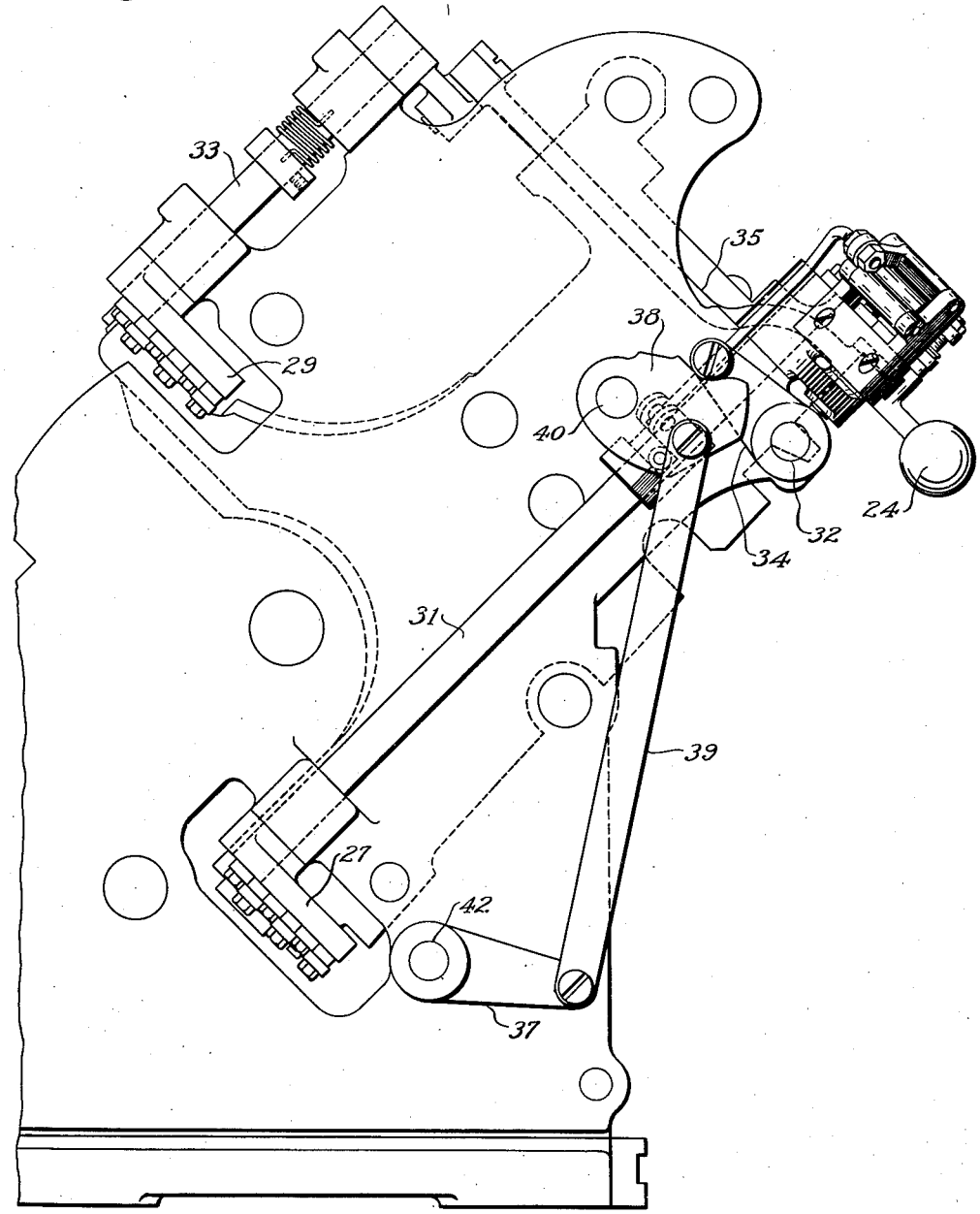

18 is a view of the same parts with the lacing units in separated relation; Fig. 19 is a view of the upper portions of the lacing units with one of the disconnecting devices in disconnected position corresponding with the positions of the disconnecting levers in Fig. 16; Fig. 20 is a view of the same parts with the lacing units in separated relation; Fig. 21 is a detail view, on an enlarged scale, of the cord end gripper employed in the present machine; Fig. 22 is a still further enlarged view of the gripping portions of the gripper; Fig. 23 is an enlarged view in side elevation of the gripping portions of the gripper in cord releasing positions; and Fig. 24 is a view in left-hand elevation of the machine with certain parts omitted to illustrate more clearly portions of the spacing mechanism for the lacing units and of the mechanism for temporarily disconnecting the lacing units upon starting the machine.

The machine illustrated in the drawings, except as hereinafter described, is the same in construction and mode of operation as the machine disclosed in applicant's Patent No. 2,106,320, but provided with the driving and stopping mechanism and with the means for temporarily disconnecting the lacing units from their spacing mechanism, on starting the machine, disclosed in applicant's pending application Serial No. 217,003. The lacing devices of the machine are arranged in a series of like units each having a frame indicated in the drawings at 2 within which is mounted a reciprocating and laterally movable eye pointed needle 4, a looper 6, and a cord-measuring finger 8 about which the lacing cord is passed by the needle while forming a lacing so that sufficient slack will be provided in the completed lacing to permit opening out of the laced upper for application to a last. Each unit also carries a pair of individual clamping members 10 and 12, a cord cutting knife 14, and a pair of cord end gripping members 16 and 18 for maintaining the cord under proper control after being severed by the knife and until the lacing operation on a new shoe upper, indicated at 25, is started. Each frame is slidingly mounted on certain horizontal shafts and rods including the shafts 20 and 22 and the rod 23 (see Fig. 15).

Like the machine of the patent and application, the spacing mechanism for the spacing frames comprises a single manually actuated lever 24 which is connected at three widely separated points to the lacing frames by means of three sets of links, one set being directly connected to the lever (see Fig. 14), and the other sets being connected to arms 27 and 29 secured to the lower ends of parallel inclined shafts 31 and 33 (see Fig. 24), which shafts are connected by a link 35 and to the upper end of one of which the arm 24 is secured. As in the machine of the pending application, the spacing links which are connected to the manually actuated lever 24, are temporarily disconnected from the lever upon starting the machine through mechanism actuated from the hub of a cam 38, and connections from the starting treadle of the machine including a rock shaft 42, an arm 37 secured to the shaft, and a link 39 connecting the arm 37 and the cam 38.

Also as in the machine of the patent and application, the work clamping devices, in addition to the individual clamping members 10 and 12, comprise upper and lower clamp jaws 30 and 58 mounted on the main frame of the machine at one end of the series of needles. The upper clamp jaw 30 is actuated as in the machine of the patent, being secured to a horizontal shaft 32 to which an arm 34 is made fast. The arm 34 carries a roll 36 cooperating with the cam 38 above referred to mounted to rotate loosely on a horizontal shaft 40 and connected to the starting treadle of the machine through the link 39, arm 37 and rock shaft 42.

The driving and stopping mechanism of the machine and the connections from the starting treadle of the driving and stopping mechanism and to the rock shaft 42 are the same as in the machine of the pending application, as indicated in Fig. 1. In the illustrated construction, when the starting treadle of the machine is depressed, an arm 44 on the right end of shaft 42 is oscillated through a link 46 connected between the arm 44 and a control or carrier arm 48 which is lowered by a connection with the upper end of a treadle rod 50. Depression of the treadle rod first lowers the clamp jaw 30 and thereafter starts the machine into operation.

The clamp jaw 30 of the illustrated machine is provided with a bar indicated at 28 which extends substantially parallel to the line of needles and to the line of eyelets after an upper has been placed in the machine. This bar is somewhat similar to the transversely extending bar of the patented machine but is differently located and performs a different function, as will be hereinafter described.

The mechanisms for actuating the lower clamp jaw 58 and the individual clamping members 12 to clamp and release the upper 25 are the same as in the machine of the patent. The mechanism for actuating the lower clamp jaw comprises the shaft 60 to which the clamp jaw is secured and connections operated from a cam on a shaft 54 (Fig. 2) rotating once for each complete lacing operation of the machine. As fully explained in the patent, the clamp jaw and the clamping members are actuated to grip the upper 25 after the upper has been moved by the needles between the clamping members 10 and 12. The mechanism for actuating the clamping members 12 comprises cam actuated arms, one of which is shown at 27 in Fig. 2, and disconnectible connections between the arms and the rear ends of the members.

The individual clamping members 10 are stationary and are fixed in the lacing frames 2. In the patented machine, the transverse bar on the upper clamping jaw, which corresponds to the bar 28 of the illustrated machine, is so located on the clamping jaw as to engage the upper in the same plane with the gripping surfaces of the fixed individual clamping members 10. Upon starting the machine, therefore, the transverse bar is brought into a position to cooperate with the lower clamping jaw in clamping the upper and also with the individual lower clamping members corresponding to the members 12 of the illustrated machine, which members in the patented machine extend outwardly beneath the transverse bar and press the upper against the bar at some distance from the line of eyelets, as well as against the fixed individual clamping members. As distinguished from this construction, the transverse bar 28 of the illustrated machine is so secured to the clamp jaw 30 that when the jaw is moved downwardly in starting the machine, the bar comes to rest above the plane of the gripping surfaces on the fixed clamping members 10, the distance from the gripping surfaces of the clamping members 12 to the bar being greater than the thickness of the upper. Also in the illustrated machine, the individual lower clamping members 12, instead of extending beyond the line of eyelets, are provided with clamping surfaces which terminate substantially at the line of eyelets. The upper is thus securely clamped at its edges only and the eyeletted edges of the upper are held securely in position while the unclamped portion of the upper beyond the line of eyelets is engaged by the transverse bar 28 which acts to confine and restrain without tightly clamping the body portion of the upper and prevents the upper from interfering with the operation of the needles, loopers and other lacing devices or from being injured thereby. To aid in controlling the unclamped portion of the upper, the lower individual clamping members 12 of the illustrated machine are extended downwardly and beyond the transverse bar 28 and are provided with surfaces which diverge from the clamping surfaces of the individual clamping members and which are arranged to contact with the under side of the unclamped portion of the upper. The downwardly extending terminals 26 of the clamping members 12, being spaced from the oppositely disposed bar 28 a distance greater than that between oppositely disposed individual clamping members 10 and 12, thus cooperate with the transverse bar 28 in loosely confining the unclamped portion of the upper and form a throat to receive the upper as it is placed in the machine and as it is moved by the needles into operating position. To guide the upper more effectively during its movement to operating position and guard against possible injury to the edges of the upper by contact with the ends of the clamping members, the gripping surfaces of both clamping members 10 and 12 are beveled at their ends. To prevent the upper from being caught or damaged by the extreme ends of the clamping members 12, the terminals 26 of the members are extended into positions where they overlap the cord end gripping members 10 while the members are in their lowest position before the machine has started, as illustrated in Fig. 1.

As has been stated, a feature of the present invention contemplates the provision of a support for the upper when placed on the lacing needles, constructed and arranged to move with the needles during their movement to operating position. In the illustrated machine, and as best shown in Figs. 3 to 7 inclusive, this support consists of an upper supporting gage block upon the outer end of the lower clamp jaw 58. In the machine of the patent, the lower clamp jaw is secured to an arm rigidly connected with a shaft corresponding to the shaft 40 of the illustrated machine. In embodying this feature of invention in the illustrated machine, an arm 55 is secured to the shaft 40 and is provided with a pair of aligned bearings within which is supported a spindle 56 (see Figs. 6 and 8) extending radially of the shaft 40. To the forward end of this spindle 56, the gage block is secured. The gage block is provided on its upper side and outer end with a surface arranged to receive and support the upper when placed in the machine, the parts of the machine at this time being in the position indicated in Fig. 3 and the upper being applied as indicated in Fig. 1. After the upper has been placed on the needles and pressed against the block in the lower clamp jaw 58, the clamp jaw 30 is lowered to the position indicated in Fig. 4 and the machine is started into operation, the needle, with the upper thereon, being moved to operating position, as also illustrated in Fig. 4. During this movement of the needles, the upper supporting block is caused to be moved inwardly along with the needles by mechanism hereinafter described, the spindle 56 sliding lengthwise in the bearings of the arm 55. The supporting block of the lower jaw 58 is constructed and arranged to engage the upper 25 close to or substantially at the line of eyelets and thus permits the upper to be clamped at this point without interference from the folded back tongue or portions of the upper other than the eyeletted edges. The supporting block is thus also enabled to cooperate with a clamping surface on the clamp jaw 30 arranged to engage the eyeletted edge of the upper at the line of eyelets opposite the supporting block.

The needles are constructed, arranged and actuated as in the patented machine. The needles reciprocate in their carriers 60 towards and from the upper and the carriers are actuated to move the needles with the upper into and out of operating position and to pass loops of lacing cord alternately through the eyelets and over the edges of the upper. To actuate the carriers 60, a horizontal rod 62 passes loosely through openings in the carriers and is fixed at its ends to a pair of arms, one of which is indicated in Fig. 2 at 64, made fast to a rock shaft 66. To oscillate the rock shaft 66, the shaft carries an arm 68 pivotally connected by a link 70 to a pivot 72 forming a joint between two cam actuated mechanisms. One of the mechanisms serves to oscillate the needle carriers 60 during lacing operations and the other mechanism is arranged to cause the needles to be moved into and out of operating position.

The mechanism for oscillating the needles during the lacing operations includes a link 74 connected between the pivot 72 and a stud 76 carrying a cam roll actuated by a cam slot 78 formed in a cam rotating three times during each lacing operation.

The mechanism for oscillating the needles upon starting and at the end of a lacing operation includes a link 80 connected with the pivot 72 and an arm 82 loose on a shaft 84 rotatable in the frame of the machine. The arm 82 carries a slide 86 having a tooth-shaped portion engaging a notch in the lower end of a lever 88 by means of which the arm 82 is connected to the lever. The upper end of the lever 88 carries a cam roll engaging a cam slot 90 in a cam secured to the shaft 54 which makes one revolution during each lacing operation. The slot 90 is so shaped as to give the needles an extra outward movement at the end of the lacing operations. In order to provide a quick inward movement of the needles in starting as they carry the upper between the individual clamp members 10, 12, the arm 82 has connected to it a spring 92 and the slide 86 is moved yieldingly out of engagement with the notch in the lever 88 during the first part of its movement before the machine starts. This is accomplished by a trip lever 94 overlying a pin 96 on the slide 86 and having a roll 98 cooperating with a slot in a stationary cam block 100. The trip lever is pivotally mounted on an arm 102 secured to the shaft 84 which also has secured to it a forked arm 104. The forked ends of the arm 104 surround a roll 106 on a block 108 fast on a vertically slidable clutch control rod 110 which is movable towards and from an opening in a cam follower arm 111 for controlling a main driving clutch and brake member 112 of the driving and stopping mechanism.

In the present machine, the arm 64 has a flattened surface at the front of its upper end which engages a set screw 114 having a loosely supported button 116 at its free end, shown best in Fig. 3, secured in a downwardly extending arm of the gage block of the clamp jaw 58, to move the gage block with the spindle 56 outwardly to a position adjacent the needles at the end of the lacing operation. When the upper is applied to the machine, the eyelets are pressed over the needles until the upper rests against the gage block 58 (Fig. 9). When the confining bar 28 and clamp jaw 30 are moved into active position, the upper is located on the needles properly to pass readily between the clamping members 10, 12. While the needles draw the upper into operative position between the clamping members, the gage block is carried yieldingly with the needles in a direction at right angles to the eyeletted upper edges by a spring 118 stretched between perforated pins on the block and on the arm 55, the spindle 56 sliding in its bearings in the arm 55 (see Fig. 4).

With certain types of shoe uppers, and particularly with small sized Blucher uppers, it is desirable to clamp the upper as close as possible to the last pair of eyelets to be laced at the toe end of a shoe upper in order to prevent the folded back tongue from forcing itself between the eyelets of the last pair during lacing operations and thus becoming impaled by a lacing needle.

As has been stated, in the illustrated machine, the block of the lower clamp jaw 58, acts as a support and gage, in addition to cooperating with the clamp jaw 30, and in order to permit the upper to be gripped very close to the eyelet pair nearest the toe end of the shoe upper, the block of the lower jaw 58 is arranged to be shifted lengthwise of the eyeletted edges of the upper. The position of the gage block while clamping the upper is clearly indicated in Fig. 10. The shifting movement takes place only during the downward movement of the gage block which occurs after the parts have assumed positions shown in Fig. 5. When the lacing operations have been completed during the final reciprocation of the needles, the upper is released from the grip of the clamp jaws and individual clamping members, the needles having passed outside the eyelets across the edges of the upper (see Fig. 7). During the releasing action of the clamp jaws, the block of the jaw 58 is shifted towards the left, looking from the front of the machine, to withdraw its beveled upper engaging surface from between the adjacent thread measuring finger and the upper so that the block will not obstruct release of a lacing surrounding the measuring finger. Thereafter, the needle carriers 60 are again moved downwardly, causing the gage block to be returned to its gaging position of Fig. 3.

The mechanism for shifting the upper engaging surface of the gage block of the jaw 58 lengthwise of the eyeletted edge of the upper is actuated by the needle carrier mechanism and comprises a finger 120 secured to a flatted portion of the spindle 56 slidingly engaging the left-hand surface of the first lacing unit frame at the left end of the series of units. The finger 120, when resting against the frame of the lacing unit, allows the spring 118 to hold the gage block in clamping position against a shoulder 122 on the arm 55 (Fig. 10). This condition exists when the gage block is actuated to clamp the upper 25. When the gage block is actuated to release the upper, the finger 120 is raised from the frame of the lacing unit by a C-shaped cam plate 124 pivoted on a stud 126 secured in the frame 2 of the end lacing unit. While the gage block is being actuated to release the upper, the cam plate is held against the head of a screw 128 in the lacing unit frame 2 by a leaf spring 130 secured to a stud 132 in the arm 64 of the needle carrier actuating mechanism. The spring 130 rests against a pin 134 in the arm 64 and presses against a downwardly projecting lug on the cam plate 124. As the finger 120 moves across the upper end of the cam plate 124, the spindle 56 is rocked and gage block of the jaw 58 is shifted in the desired direction (Fig. 7). Thereafter, the needle carriers 60 move downwardly and outwardly causing the gage block and finger 120 on the spindle 56 to be moved into the positions of Fig. 3, where the finger is clear of the cam plate 124. During this movement, the finger 120 slips off the cam plate returning the gage block to a position close to the nearest needle. At the same time, the leaf spring 130 moves away from the lug on the cam plate so that no pressure is exerted to maintain the cam plate in operative position. When the machine is again started and the needle carriers move upwardly and inwardly of the machine, the finger 120 wipes along the surface of the first lacing frame, brushing the cam plate 124 along with it, as indicated in Fig. 4. When the arm 55 is again moved upwardly to cause the block of the jaw 58 to grip the upper as indicated in Fig. 5, the spring 130 again engages the lug on the cam plate 124 and causes it to slide beneath the finger 120.

In the machine of the prior patent, it has been found under some conditions that, after the lacing is completed, the cord-measuring fingers will remain against the rod 136. In this position, a cord-measuring finger may become caught on the upper as it is being drawn by the needles between the clamping members. In order to prevent this occurrence, in the present machine, the cord-measuring fingers 8 are actuated through connections with the needle actuating mechanism to move the cord-measuring fingers into positions where they will not interfere with the movements of the upper.

To actuate the cord-measuring fingers in the present machine, there is mounted beneath the rearward ends of the fingers a retracting arm 138 (Figs. 2 and 8). The arm 138 is secured at right angles to a cord-measuring finger retracting lever 140 mounted on a screw stud 142 threaded in the frame of the first lacing unit at the left end of the series. The connections for actuating the lever 140 comprise a pair of springs 144 and 146 coiled around an elongated threaded pin 148 passing loosely through an opening in the head of a pivot 149 loosely supported in the lever 140, one spring being disposed above and the other below the pivot 149. The pin 148 is secured at one end in a perforated block 150 through which the shaft 62 extends. When the lacing operations are completed and the needle carriers 60 are moved outwardly just before the machine comes to rest, the shaft 62 of the needle carrier actuating mechanism causes the pin 148 to slide lengthwise in the head of pivot 149, compressing the spring 144 between a nut 152 on the pin 148 and the pivot 149. The pressure of the spring 144 against the pivot 149 rocks the lever 140 in a direction to move the retracting arm 138 against the inner ends of the cord-measuring fingers, thus lowering their hooked ends into the positions indicated in Fig. 3. The cord-measuring fingers are held in these positions until the machine is again started, at which time rearward movement of the shaft 62 of the needle carrier actuating mechanism causes spring 146 on pin 148 to be compressed, rocking the cord-measuring finger retracting lever 140 to inoperative position (Figs. 2 and 5).

In order to guide the cords as they are carried across the edges of the upper by the needles and also to support the edges of the upper against the pull of the lacing cords encircling the measuring fingers at the under side of the upper, there are yieldingly supported on the fixed clamping members 10 above the upper a series of guide points 154 arranged to contact with the eyeletted edge of a shoe upper close to the eyelets. The guide points are best shown in Figs. 9 to 11 and cross the eyeletted edges of the upper at oblique angles. The guide points engage a surface of the upper at a location circumferentially displaced about the eyelets approximately 90 degrees from the locations of the clamping members 10 on the upper, each clamping member being disposed to engage the upper at the ankle opening side of the eyelet. The angular displacement of the clamping members and guide points about the eyelets maintains the eyelets in a plane at right angles to the needles, resisting any tendency of the upper to pucker along its edges. As the lacings are being formed, loop tightening pulls are exerted successively on the lacing cords by the loopers 6. The cords are carried across the edges of the upper, through the eyelets, and beneath the cord-measuring fingers. The guide points 154 are so formed that as the needles carry the cords to the loopers across the edges of the upper, the cords will be directed to cross the upper edges immediately opposite the adjacent eyelet pairs and the pull exerted on the cords will be taken up at least in part by the guide points (see Fig. 11).

The guide points, including the one indicated at 156 (see Fig. 9) on the first lacing unit at the left-hand end of the series, are constructed from flexible spring wire bent into generally S-shape. The inner end of each wire has a right angle bend which fits within an opening passing transversely through a clamping member 10 and the shank portion of the wire extends lengthwise of the clamping member along a groove in the clamping member. The groove fits closely with the shank portion near the inner bent end of the wire but provides space for yielding movement in any direction along the forward portion of the guide point nearer the cord-engaging end. To restrict the yielding movement of the cord-engaging end of each guide point along the eyeletted edges of the upper so that the guide point will always engage the upper in correct relation with the eyelets, the portion of the guide point close to the cord-engaging end rests in sliding contact with a finished vertical surface 158 on the supporting clamping member 10. By taking out one or more screws 160 passing through the frames of the units into threaded openings in the clamping members, the clamping members 10 may be removed from the machine. When a clamping member is removed from the machine, the attached guide point is readily replaceable, the arrangement being such that the act of securing the clamping member in position also causes the shank of the guide point to be held in place against the frame of the respective lacing unit.

The guide point 156 at the left end of the series is constructed of the same material as guide points 154 but is bent to cause the lacing in the first eyelet near the toe end of the eyeletted edge to be formed at the right side of the guide point between the guide point and the clamping member 10 on which it is supported. Each guide point 154 on the remaining clamping members 10 is arranged to cause the lacing to be formed at the left side of both the guide point and the clamping member to which it is secured. Thus all the lacings are formed between the end guide points including the one 156 at the left end and one of the others at the right end, depending on the number of eyelets to be laced. The lacings at the ends of the eyeletted edges, therefore, are kept from slipping around the corners terminating the edges by the end guide points. The guide point 156 crosses the edge of the upper substantially at right angles and does not support the adjacent lacing against the pull of the loop taker. The only result of the lack of support is to cause the lacing to be somewhat tighter than the others, which is desirable in the first pair of eyelets at the toe end of a shoe upper, giving it a better last fitting shape. The other guide points, however, are bent in substantially the same angular relation to the upper edges as the hooked ends of the cord-measuring fingers 8. After the lacings are completed, movement of the upper to release the lacings from the cord-measuring fingers, therefore, releases the lacings also from the guide points 154.

In the patented machine, the cord end gripping members are actuated during the final operations to grasp and to release temporarily the end portions of the lacing cords in order that the extreme ends may be drawn close to the gripping members, thus leaving only short lengths projecting. By shortening the projecting ends of cord in this way, when a new lacing operation is started, only a short length of cord which requires no trimming will remain extending from the eyelets being laced. If the cord end gripping members in the patented machine are not accurately adjusted or shaped, the cords may move laterally from the gripping surfaces of the members and escape entirely from the grasp of the members so that when a new lacing operation begins, the cords will not be handled correctly.

In order to prevent the lacing cords from escaping the grasp of the cord end gripping members 16 and 18 of the present machine, the gripping portion of each member 18, as shown more clearly in Figs. 21 to 23 inclusive, has a notched flange 162 overlapping the cooperating gripping surfaces of both gripping members. The flange 162 extends transversely to the length of the cord and before the cord is grasped, prior to the cutting of the cord, the gripping members are opened to the position indicated in dotted lines in Fig. 22. As a cord is grasped, the cord is carried into the notch of the flange, the gripping members being completely closed. During the final operation of the machine, the gripping members are moved slightly to the position indicated in Figs. 22 and 23 to release the cord and permit it to be drawn backwardly by the action of a needle so that only a short end projects from the gripping members when they are finally closed to again grasp the cord. During the releasing movements of the gripping members, the cords are retained in the notch of the flange, the only way in which the cords may escape at this time being by a lengthwise movement. By constructing the gripping members in this way, slight irregularities in adjustment and shape of the gripping surfaces on the members will not cause improper operation of the members. To prevent each flange 162 from jamming the cord against the adjacent gripping member 16, the opposing surfaces of the flange and member 16 are spaced and made concentric with the shaft 163 on which the members are mounted.

As has been stated, the mechanism for spacing the frames of the lacing units, like the mechanism of the patent and application, comprises three sets of links operated from a single lever and connected at widely separated points to the frames. In the construction illustrated, there are six links in each group, the links which are directly pivotally connected to the manually operated lever 24 (see Fig. 14) being indicated at 164, 166, 168, 170, 172 and 174. The simplified and improved means for disconnecting certain of the frames from the spacing mechanism comprises latches mounted on the frames to be disconnected, these latches, in the construction illustrated, being in the form of blocks 180, see Figs. 15 and 16, and a block being slidingly mounted on each disconnectible frame at each of the three points of connection with the spacing links. The latching blocks for the frame at the right-hand end of the series are indicated at 180. Each latching block 180 is formed with an elongated slot 182 (see Fig. 13), by means of which the block is slidingly mounted on a pair of pins 184 projecting from the lacing frame. At one end, each block 180 has a latching lug which engages a notch 186 in the end of each spacing link 174. The links 174 are slidingly supported at their right ends by flat sided guide pins 118 secured to the lacing frame close to the lugs on the latching blocks in such relation that when the lugs enter the notches in the links, the links will be connected to the frame of said lacing unit and when the blocks are moved away from the notches, the links will be disabled and slide idly along the pins 188. The means for actuating the latch blocks 180 comprises a plate 178 mounted to slide on the frame 2 at the right-hand end of the series and bolted to the blocks 180, the construction and arrangement being such that a sliding movement of the plate 178 actuates all of the latch blocks 180 simultaneously.

The second lacing frame from the right end of the series is disconnectibly connected with spacing links 172 in a similar manner by latching blocks 190, each having a slot 192 through which project pins 194 and 196 carried by the second lacing frame from the right end of the series. Each latching block 190 has a lug which is movable towards and from a notch 198 in a link 172, the link being slidably supported on said lacing frame by a flat sided guide pin 200 secured in the frame of the said lacing unit. To actuate the blocks 190 towards and from the notches 198 in the links 172, the blocks 190 have projecting from them dowels 202 slidingly received in slots 204 formed transversely of the series of lacing units in controlling bars 206 secured to a plate 176 mounted to slide on the end frame 2 of the series beside the plate 178. The bars 206 overlie the blocks 180 and are recessed on their under side to receive the blocks which thus act to hold the plate 176 in position against the plate 178. The slot 204 is of sufficient length to permit relative spacing movement between the lacing frame on which the plate 176 is mounted and the lacing frame on which the latching block 180 is mounted.

To latch the disconnected lacing frames to an adjacent lacing frame which remains connected to its spacing links, each latching block has a notched arm movable towards and from a pin secured to the adjacent lacing unit. The notched arms of the latching blocks 180 engage extending ends of the pins 194 on the second lacing unit from the right of the series, which pins are shaped to fit the notches. The notched arms of the latching blocks 190 cooperate with pins 207 on the third lacing unit from the right end of the series, which pins are correspondingly shaped. When the latching blocks 180 are actuated to disconnect the first lacing units of the right end of the series, the notched arms of the blocks connect the lacing unit with the pins 194 of the second lacing unit. When the blocks 190 are actuated to disconnect the second lacing unit from the right, the notched arms of the blocks engage the pins 207 to latch both disconnected lacing units to the third lacing unit from the left, the arrangement being such that all the lacing units are always connected either to the lacing connections or to an adjacent lacing unit. To prevent the spacing links from moving with the blocks 180 or 190 while the blocks are being actuated away from the notches in the respective links, each link carries a button 208 which rides along the forward surface of an adjacent spacing link, holding the link 172 or 174 in contact with the guide 188 or 200, as indicated in Figs. 17 and 19.

For actuating the plates 176 and 178 to connect and disconnect the frames of the lacing units at the right end of the series from their spacing connections, and to disconnect and connect said frames with each other, the plates are arranged to be actuated individually by separately shiftable disabling levers 210 and 212 having similar handles 213. The plate 176 has pivotally connected to its one end of a link 214, the other end of which has a circular shaped lug rotatably supported in a socket formed at the lower end of the lever 212. The lever 212 is provided with a central opening loosely fitting the shaft 22, which shaft acts as a fulcrum for the lever. When the upper handle end of the lever 212 is moved forwardly, the plate 176 is moved rearwardly and the second frame from the right end of the lacing unit series is disconnected from its spacing connections.

To lock the lever 212 in shifted position with either the lacing frame connected or disconnected from its spacing connections, sliding locking means is provided for the lever in the form of a pin 216 fitting either of two recesses in the lever. To shift the lever, it is necessary to slide the lever bodily downwardly to disengage it from the pin 216 and to resist this movement, the link 214 is pressed upwardly by an end of a double spring 218 supported by a pin 220 on the plate 176. As an additional means for supporting and guiding the plate 176 on the right-hand lacing frame, a slot 222 is formed in the plate 176 to receive a stud 224 fixed in the lacing frame.

The plate 178 is actuated from the lever 210 by a similar connection. This connection consists of a link 226 pivotally connected at one end by a pin 228 passing through a perforation in the link 214 and a slot in the plate 176 and having its end fixed in the plate 178. The other end of the link 226 has a circular shaped lug fitting a correspondingly shaped socket in the lower arm of lever 210, the lever being fulcrumed loosely on the shaft 22 in the same manner as lever 212. Lever 210 also has formed at its upper end a pair of recesses fitting the pin 216, either one of which may be brought into engagement with the pin, an end of the spring 218 acting on the link 226 to maintain the recesses in the lever and the pin 216 in locking engagement. The plate 178 also has a guiding slot 227 fitting the pin 224.

To prevent disconnection or connection of the lacing units from the spacing connections except in positions where the lacing frames are brought together, as in Figs. 17 and 19, so that the disconnected frames may be connected to adjacent frames with certainty, the shaft 22 has a crescent-shaped slot 229 cut circumferentially into its surface at a location where it may receive the levers 210 and 212 when the lacing frames are brought together. The central openings in the levers are so arranged that when the lacing frames are separated along the shaft 22, the outer surface of the shaft will prevent the levers 210 and 212 from being disengaged from the pin 216.

Figure 18:
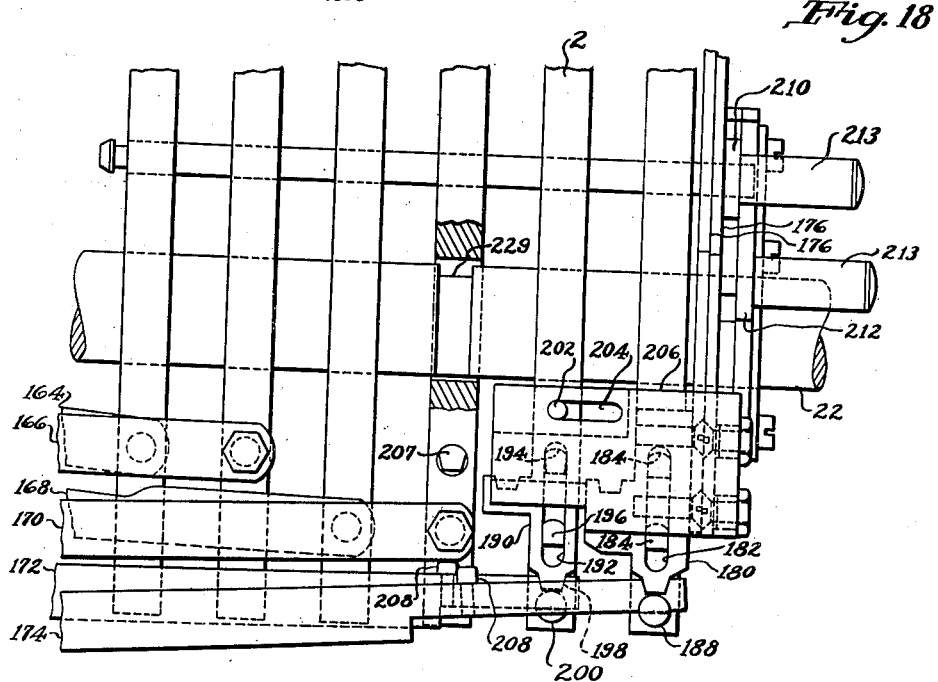

In order to prevent the lacing units from being connected or disconnected in improper sequence, an interlocking device is provided between the lacing units. The second lacing frame at the right end of the series cannot be disconnected from its spacing connections to any advantage while the first frame at the right-hand end remains connected to its spacing connections. Accordingly, a pin 239 is carried by the lever 210 and arranged to engage the forward edge along a cut-away portion of the lever 212. With both levers 210 and 212 in positions where the respective lacing frames are connected to their spacing connections, as in Figs. 15 and 17, the lever 212 may not be actuated to disconnect the second lacing frame from the right without causing the pin 239 to actuate the lever 210 at the same time. If, however, the lever 210 is shifted to disconnect the left-hand lacing frame, as in Figs. 16 and 19, then the shiftable lever 212 remains in its inoperative position. Regardless of which lever is actuated or in what direction the actuation is made, after the lacing frames are again separated, as in Figs. 18 and 20, no further movement of the shiftable levers may occur because of their movement away from the slot 229 in the shaft 22.

The nature and scope of the invention having been indicated and a construction embodying the several features of the invention having been specifically described, what is claimed is:

1. In a shoe upper lacing machine comprising a series of needles arranged to pass through aligned eyelets of a folded shoe upper, means for reciprocating the needles and devices cooperating with the needles during their reciprocations to form a series of cord lacings extending through the eyelets and across the edges of the folded upper, the combination of individual upper clamping members between adjacent needles arranged to extend from outside the edges of the upper and across the edges of the upper while impaled by the needles and to terminate on both sides of the upper substantially at the line of eyelets, and confining devices located at opposite sides of the upper, at least one of the confining devices being actuated towards and from the upper and spaced from another of the confining devices disposed oppositely at the other side of the upper while the individual clamping members are clamping the upper, the spacing of the confining devices being greater than the distance between opposite clamping members for engaging the unclamped portion of the upper beyond the eyelets to prevent interference by said unclamped portion with the needles and cooperating lacing devices.

2. In a shoe upper lacing machine comprising a series of needles arranged to pass through aligned eyelets of a folded shoe upper, means for reciprocating the needles and devices cooperating with the needles during their reciprocations to form a series of cord lacings extending through the eyelets and across the edges of the folded upper, the combination of individual upper clamping members between adjacent needles arranged to extend from outside the edges of the upper and across the edges of the upper while impaled by the needles and to terminate on both sides of the upper substantially at the line of eyelets, and confining devices comprising a bar extending substantially parallel to the line of eyelets at one side of the upper in spaced relation to another of said confining devices at the other side of the upper while the individual clamping members are clamping the upper, the spacing of the confining devices being greater than the distance between opposite clamping members for engaging the unclamped portion of the upper beyond the eyelets to prevent interference by said unclamped portion with the needles and cooperating lacing devices.

3. In a shoe upper lacing machine comprising a series of needles arranged to pass through aligned eyelets of a folded shoe upper, means for reciprocating the needles and devices cooperating with the needles during their reciprocations to form a series of cord lacings extending through the eyelets and across the edges of the folded upper, the combination of upper clamping members arranged to extend across the edges of an upper at both sides of the upper while the upper is impaled by the needles, the clamping surfaces of said members when in contact with the upper being substantially parallel and terminating substantially at the line of the eyelets, the clamping members on one side of the upper being provided with surfaces diverging from the clamping surfaces and arranged to contact with the unclamped portion of the upper.

4. In a shoe upper lacing machine comprising a series of needles arranged to pass through aligned eyelets of a folded shoe upper, means for reciprocating the needles and devices cooperating with the needles during their reciprocations to form a series of cord lacings extending through the eyelets and across the edges of the folded upper, the combination of upper clamping members provided with substantially parallel clamping surfaces arranged to extend across the edges of an upper while impaled by the needles and to terminate substantially at the line of eyelets, the clamping members on one side of the upper being provided with surfaces diverging from the clamping surfaces and arranged to contact with the unclamped portion of the upper, and a bar extending substantially parallel to the line of eyelets arranged to act on the unclamped portion of the upper opposite said diverging surfaces.

5. In a shoe upper lacing machine comprising a series of needles arranged while stationary to pass through aligned eyelets of a folded shoe upper placed thereon, means for moving the needles with the upper from a position in which the upper may be readily placed thereon to operating position, means for reciprocating the needles, and devices cooperating with the needles during their reciprocations to form a series of cord lacings extending through the eyelets and across the edges of the folded upper, the combination of upper clamping members arranged to extend across the edges of an upper while the upper is in operating position, the clamping surfaces of said members when in contact with the upper being substantially parallel and terminating substantially at the line of the eyelets, and the clamping members at the side of the upper from which the needles enter being provided with surfaces diverging from the clamping surfaces and arranged to support the unclamped portion of the upper during the movement of the upper to operating position.

6. In a shoe upper lacing machine comprising a series of needles arranged while stationary to pass through aligned eyelets of a folded shoe upper placed thereon, means for moving the needles with the upper from a position in which the upper may be readily placed thereon to operating position, means for reciprocating the needles, and devices cooperating with the needles during their reciprocations to form a series of cord lacings extending through the eyelets and across the edges of the folded upper, the combination of clamping members arranged to extend across the edges of an upper while the upper is in operating position, and a support for the upper, when placed on the needles, movable with the needles during their movement to operating position.

7. In a shoe upper lacing machine comprising a series of needles arranged while stationary to pass through aligned eyelets of a folded shoe upper placed thereon, means for moving the needles with the upper from a position in which the upper may be readily placed thereon to operating position, means for reciprocating the needles, and devices cooperating with the needles during their reciprocations to form a series of cord lacings extending through the eyelets and across the edges of the folded upper, the combination of a support for the upper movable with the needles during their movement to operating position and provided with an upper clamping surface extending across the edges of an upper while impaled by the needles and terminating substantially at the line of the eyelets, and a clamp jaw provided with a clamping surface cooperating with the clamping surface of the support.

8. In a shoe upper lacing machine comprising a series of needles arranged to pass through aligned eyelets of a folded shoe upper, means for reciprocating the needles and devices cooperating with the needles during their reciprocations to form a series of cord lacing extending through the eyelets and across the edges of the folded upper, the combination of a slack-forming, cord-measuring finger associated with each needle over which the cord is passed by the needle, and means for securing the upper in position to receive the lacings comprising clamp jaws arranged to engage the upper at one end of the series of needles, and means for shifting one of said jaws lengthwise of the series of needles from between a thread measuring finger and the upper in releasing the upper.

9. In a shoe upper lacing machine comprising a series of needles arranged to pass through aligned eyelets of a folded shoe upper, means for reciprocating the needles and devices cooperating with the needles during their reciprocations to form a series of cord lacings extending through the eyelets and across the edges of the folded upper, the combination of means for securing the upper in position to receive the lacings including a clamp member, and mechanism for actuating the clamp member to clamp and release the upper and for moving the member lengthwise of the series of needles.

10. In a shoe upper lacing machine comprising a series of needles aranged while stationary to pass through aligned eyelets of a folded shoe upper placed thereon, means for moving the needles with the upper from a position in which the upper may be readily placed thereon to operating position, means for reciprocating the needles, and devices cooperating with the needles during their reciprocations to form a series of cord lacings extending through the eyelets and across the edges of the folded upper, the combination of a support for the upper movable with the needles during their movement to operating position and provided with an upper clamping surface extending across the edges of an upper while impaled by the needles and terminating substantially at the line of the eyelets, and mechanism for actuating the support to clamp the upper and for moving the support lengthwise of the series of needles.

11. In a shoe upper lacing machine comprising a series of needles arranged while stationary to pass through aligned eyelets of a folded shoe upper placed thereon, means for moving the needles with the upper from a position in which the upper may be readily placed thereon to operating position, means for reciprocating the needles, and devices cooperating with the needles during their reciprocations to form a series of cord lacings extending through the eyelets and across the edges of the folded upper, the combination of a support for the upper movable with the needles during their movement to operating position and provided with an upper clamping surface extending across the edges of an upper, while impaled by the needles, at one end of the line of needles and terminating substantially at the line of the eyelets, a clamp jaw provided with a clamping surface cooperating with the clamping surface of the support, and a bar on the clamp jaw extending substantially parallel to the line of eyelets and acting on the unclamped portion of the upper to prevent interference thereby with the needles and cooperating lacing devices.

12. In a shoe upper lacing machine comprising a series of needles arranged to pass through aligned eyelets of a folded shoe upper, means for reciprocating the needles and devices cooperating with the needles during their reciprocations to form a series of cord lacings extending through the eyelets and across the edges of the folded upper, the combination of upper clamping members arranged to extend across the edges of an upper at both sides of the upper while the upper is impaled by the needles, the clamping surfaces of said members when in contact with the upper being substantially parallel and terminating substantially at the line of the eyelets, the clamping members on one side of the upper being provided with surfaces diverging from the clamping surfaces and arranged to contact with the unclamped portion of the upper, and cord end gripping members associated with each needle for holding the cords when the machine is started, said gripping members being arranged to shield the diverging surfaces of the clamping members while an unlaced upper is being applied to the machine.

13. In a shoe upper lacing machine comprising individual upper clamping members, a series of needles between the clamping members arranged to pass through aligned eyelets of a folded shoe upper, means for reciprocating the needles, and devices cooperating with the needles during their reciprocations to form a series of cord lacings extending through the eyelets and across the edges of the folded upper, the combination of slack-forming, cord-measuring fingers at one side of the upper about which the cords are passed by the needles, and cord guiding points, in addition to the clamping members, at the other side of the upper and cooperating with the measuring fingers to guide the lacing cords as they are carried across the edges of the upper and located with relation to the needles to cause the cords to cross the upper edges immediately opposite the eyelets through which the cords extend.

14. In a shoe upper lacing machine comprising a series of needles arranged to pass through aligned eyelets of a folded shoe upper, means for reciprocating the needles, and devices cooperating with the needles during their reciprocations to pass loops of cord through aligned eyelets and across the edges of the upper and to tighten the loops, the combination of means at opposite sides of the upper to support the loops against the pull exerted on the cords to tighten the loops.

15. In a shoe upper lacing machine comprising a series of needles arranged to pass through aligned eyelets of a folded shoe upper, means for reciprocating the needles and devices cooperating with the needles during their reciprocations to pass loops of cord through aligned eyelets and across the edges of the upper and to tighten the loops, the combination of slack-forming, cord-measuring fingers at one side of the upper over which the cords are passed by the needles, and cord guiding points at the other side of the upper cooperating with the measuring fingers to support the loops against the pull exerted on the cords in tightening the loops.

16. In a shoe upper lacing machine comprising a series of needles arranged to pass through aligned eyelets of a folded shoe upper, means for reciprocating the needles, and devices cooperating with the needles during their reciprocations to form a series of cord lacings extending through the eyelets and across the edges of the folded upper, the combination of cord guiding means associated with the needle at one end of the needle series arranged to engage the cord between the needle and the end of the eyeletted edge and prevent the cord as it is carried across the edges of the upper from slipping around the end of the eyeletted edge.

17. In a shoe upper lacing machine comprising a series of needles arranged to pass through aligned eyelets of a folded shoe upper, means for reciprocating the needles, and devices cooperating with the needles during their reciprocations to form a series of cord lacings extending through the eyelets and across the edges of the folded upper, the combination of cord guiding means associated with the end needles of the series arranged to engage the cords as they are carried across the edges of the upper at both ends of the eyeletted edges and prevent the cords from slipping around the ends of the upper edges.

18. In a shoe upper lacing machine comprising a series of needles arranged to pass through aligned eyelets of a folded shoe upper, means for reciprocating the needles and devices cooperating with the needles during their reciprocations to pass loops of cord through aligned eyelets and across the edges of the upper and to tighten the loops, the combination of slack-forming, cord-measuring fingers at one side of the upper about which the cords are passed by the needles, and cord guiding points, in addition to the clamping members, at the other side of the upper arranged to guide the lacing cords as they are carried across the edges of the upper and cooperating with the measuring fingers to support the loops against the pull exerted on the cords in tightening the loops, the measuring fingers and cord guiding points being arranged at an angle to the line of needles to permit ready withdrawal of the laced upper from the fingers and points.

19. In a shoe upper lacing machine comprising a series of needles arranged while stationary to pass through aligned eyelets of a folded shoe upper placed thereon, means for moving the needles with the upper from a position in which the upper may be readily placed thereon to operating position, means for reciprocating the needles, and devices cooperating with the needles during their reciprocations to form a series of cord lacings extending through the eyelets and across the edges of the folded upper, the combination of upper clamping members arranged to extend across the edges of the upper while the upper is in operating position, slack-forming, cord-measuring fingers over which the cord is passed by the needles, and mechanism for moving the measuring fingers with relation to the clamping members to bring the fingers out of the path taken by the upper during its movement to operating position.

20. In a shoe upper lacing machine comprising a series of needles arranged while stationary to pass through aligned eyelets of a folded shoe upper placed thereon, means for moving the needles with the upper from a position in which the upper may be readily placed thereon to operating position, means for reciprocating the needles, and devices cooperating with the needles during their reciprocations to form a series of cord lacings extending through the eyelets and across the edges of the folded upper, the combination of upper clamping members arranged to extend across the edges of the upper while the upper is in operating position, levers having slack-forming, cord-measuring fingers over which the cord is passed by the needles, an abutment against which the levers are drawn by the cords during the lacing operations, and mechanism for moving the levers with relation to the clamping members to retract the levers from the abutment and bring the fingers out of the path taken by the upper during its movement to operating position.

21. In a shoe upper lacing machine comprising a series of needles arranged while stationary to pass through aligned eyelets of a folded shoe upper placed thereon, means for moving the needles with the upper from a position in which the upper may be readily placed thereon to operating position, means for reciprocating the needles, and devices cooperating with the needles during their reciprocations to form a series of cord lacings extending through the eyelets and across the edges of the folded upper, the combination of upper clamping members arranged to extend across the edges of the upper while the upper is in operating position, slack-forming, cord-measuring fingers over which the cord is passed by the needles, and connections between the needle moving means and the measuring fingers for moving the fingers with relation to the clamping members to bring the fingers out of the path taken by upper during its movement to operating position.

22. In a shoe upper lacing machine comprising a series of eye pointed needles arranged to pass through aligned eyelets of a folded shoe upper, means for reciprocating the needles, devices cooperating with the needles during their reciprocations to form a series of individual cord lacings extending through the eyelets and across the edges of the folded upper, and means for severing the cords between the upper and the needles, the combination of cord end gripping members associated with each needle, means for actuating the gripping members to grasp a cord before it is severed, to release the cord and permit the cord to be retracted through the gripper and to again grasp the cord after it is severed, and a flange on one of the gripping members overlapping the cord gripping portions of the gripping members transversely to the length of the cord to prevent escape of the cord while released except by lengthwise movement of the cord.

23. In a shoe upper lacing machine comprising a series of relatively movable frames, each having an eyelet engaging device, the combination of spacing mechanism connected to the frames for changing the distances between the frames to correspond to the spacing of the eyelets in the upper to be laced, a member mounted on one of said frames, and means actuated by said member for disconnecting a frame from the spacing mechanism.

24. In a shoe upper lacing machine comprising a series of relatively movable frames, each having an eyelet engaging device, the combination of spacing mechanism connected to the frames for changing the distances between the frames to correspond to the spacing of the eyelets in the upper to be laced, mechanism mounted on one of said frames for disconnecting a frame from the spacing mechanism and for connecting the frame to the next adjacent frame, and means for preventing actuation of said mechanism except at the limit of the movement of the frames towards each other.

25. In a shoe upper lacing machine comprising a series of relatively movable frames, each having an eyelet engaging device, the combination of spacing mechanism connected to the frames for changing the distances between the frames to correspond to the spacing of the eyelets in the upper to be laced, and a latch mounted on a frame and movable to disconnect the frame from the spacing mechanism and to connect the frame to the next adjacent frame.

26. In a shoe upper lacing machine comprising a series of relatively movable frames, each having an eyelet engaging device, the combination of spacing mechanism connected to each frame at a plurality of separated points for changing the distances between the frames to correspond to the spacing of the eyelets in the upper to be laced, a latch at each of said points on one of said frames, a member engaging all of said latches, and means for actuating the member to move the latches to disconnect the frame from the spacing mechanism.

27. In a shoe upper lacing machine comprising a series of relatively movable frames, each having an eyelet engaging device, the combination of spacing mechanism connected to each frame at a plurality of separated points for changing the distances between the frames to correspond to the spacing of the eyelets in the upper to be laced, a latch at each of said points on one of said frames, and means mounted on the frame for moving all of said latches simultaneously to disconnect the frame from the spacing mechanism.

28. In a shoe upper lacing machine comprising a series of relatively movable frames, each having an eyelet engaging device, the combination of spacing mechanism connected to each frame at a plurality of separated points for changing the distances between the frames to correspond to the spacing of the eyelets in the upper to be laced, a latch at each of said points on one of said frames, and a sliding plate mounted on said frame and connected to all of said latches, and means for sliding the plate to move all of said latches to disconnect the frame from the spacing mechanism.

29. In a shoe upper lacing machine comprising a series of relatively movable frames, each having an eyelet engaging device, the combination of spacing mechanism including links for changing the distances between the frames to correspond to the spacing of the eyelets in the upper to be laced, disconnectible lug and notch connections between the links and one or more of the frames, and means for moving the lug and notch connections relatively to each other to disconnect or connect said frames with the links.

30. In a shoe upper lacing machine comprising a series of relatively movable frames, each having an eyelet engaging device, the combination of spacing mechanism connected to the frames for changing the distances between the frames to correspond to the spacing of the eyelets in the upper to be laced, a shaft along which the lacing frames are movable provided with a transverse slot, disconnectible connections between the spacing mechanism and one of said frames, and mechanism for actuating said disconnectible connections comprising an actuating lever mounted on one of the frames and movable into the slot of the shaft in one position only of said frame along the shaft and thereby rendered operable to actuate said disconnectible connections.

31. In a shoe upper lacing machine comprising a series of relatively movable frames, each having an eyelet engaging device, the combination of spacing mechanism connected to the frames for changing the distances between the frames to correspond to the spacing of the eyelets in the upper to be laced, a shaft along which the lacing frames are movable provided with a transverse slot, disconnectible connections between the spacing mechanism and one of said frames, and mechanism for actuating said disconnectible connections comprising an actuating lever mounted on one of the frames and movable into the slot of the shaft in one position only of said frame along the shaft, and means for locking the lever to prevent actuation of said disconnectible connections prior to the movement of the lever into said slot.

32. In a shoe upper lacing machine comprising a series of relatively movable frames, each having an eyelet engaging device, the combination of spacing mechanism connected to each frame at a plurality of separated points for changing the distances between the frames to correspond to the spacing of the eyelets in the upper to be laced, a latch at each of said points on a plurality of said frames, a plurality of sliding plates mounted on one of said frames with each plate connected to the latches of one frame only, and means for sliding each plate to move all of the latches connected thereto to disconnect a frame from the spacing mechanism.

33. In a shoe upper lacing machine comprising a series of relatively movable frames, each having an eyelet engaging device, the combination of spacing mechanism connected to the frames for changing the distances between the frames to correspond to the spacing of the eyelets in the upper to be laced, means for disconnecting a plurality of said frames from the spacing mechanism including a plurality of levers each arranged to act on the connections to a separate frame, and means for preventing actuation of said levers except in predetermined sequence.

34. In a shoe upper lacing machine comprising a series of relatively movable frames, each having an eyelet engaging device, the combination of spacing mechanism connected to the frames for changing the distances between the frames to correspond to the spacing of the eyelets in the upper to be laced, means for disconnecting two of said frames from the spacing mechanism including two levers arranged to act respectively on the connections to said two frames, and means permiting an independent movement of one lever while causing said lever to be moved by the other lever.

JOSEPH FOSSA.